(12) United States Patent
Shoji

(10) Patent No.: US 12,505,692 B2
(45) Date of Patent: Dec. 23, 2025

(54) INFORMATION PROCESSING APPARATUS, IMAGE FORMING APPARATUS, AND INFORMATION PROCESSING METHOD FOR EASILY SETTING RULES FOR ORDERING PAGE DATA

(71) Applicant: KYOCERA Document Solutions Inc., Osaka (JP)

(72) Inventor: Hidenori Shoji, Concord, CA (US)

(73) Assignee: KYOCERA Document Solutions Inc., Osaka (JP)

(*) Notice: Subject to any disclaimer, the term of this patent is extended or adjusted under 35 U.S.C. 154(b) by 520 days.

(21) Appl. No.: 17/851,027

(22) Filed: Jun. 28, 2022

(65) Prior Publication Data

US 2023/0419709 A1    Dec. 28, 2023

(51) Int. Cl.
*G06V 30/413* (2022.01)
*G06V 30/244* (2022.01)
*G06V 30/416* (2022.01)

(52) U.S. Cl.
CPC .......... *G06V 30/413* (2022.01); *G06V 30/245* (2022.01); *G06V 30/416* (2022.01)

(58) Field of Classification Search
CPC .. G06V 30/413; G06V 30/245; G06V 30/416; G06V 30/414; G06V 30/10; G06V 30/412
See application file for complete search history.

(56) References Cited

U.S. PATENT DOCUMENTS

| | | | |
|---|---|---|---|
| 8,849,033 B2 * | 9/2014 | Yoshida | H04N 1/32609 382/181 |
| 2021/0056254 A1 * | 2/2021 | Kinoshita | G06F 3/0484 |
| 2021/0097275 A1 | 4/2021 | Miyauchi | |
| 2021/0127033 A1 * | 4/2021 | Cravo | G06F 40/114 |

FOREIGN PATENT DOCUMENTS

| | | | | |
|---|---|---|---|---|
| JP | 2020-129226 A | 8/2020 | | |
| JP | 2021-057783 A | 4/2021 | | |
| WO | WO-2022035942 A1 * | 2/2022 | | G06F 16/35 |

* cited by examiner

*Primary Examiner* — Vu Le
*Assistant Examiner* — Zaid Muhammad Saleh
(74) *Attorney, Agent, or Firm* — Hawaii Patent Services; Nathaniel K. Fedde; Kenton N. Fedde

(57) ABSTRACT

Provided is an information processing apparatus that easily sets rules for ordering a plurality of scanned page data. The OCR unit performs optical character recognition for character and layout in a page for each of the plurality of page data. The rule order unit classifies the characters and layouts that are performed optical character recognition by the OCR unit based on the page ordering rules, extracts the page numbers, and calculates the certainty of the page numbers. The rule setting unit presents the certainty calculated by the rule order unit to the user and causes the user to set the rule.

8 Claims, 24 Drawing Sheets

FIG. 3
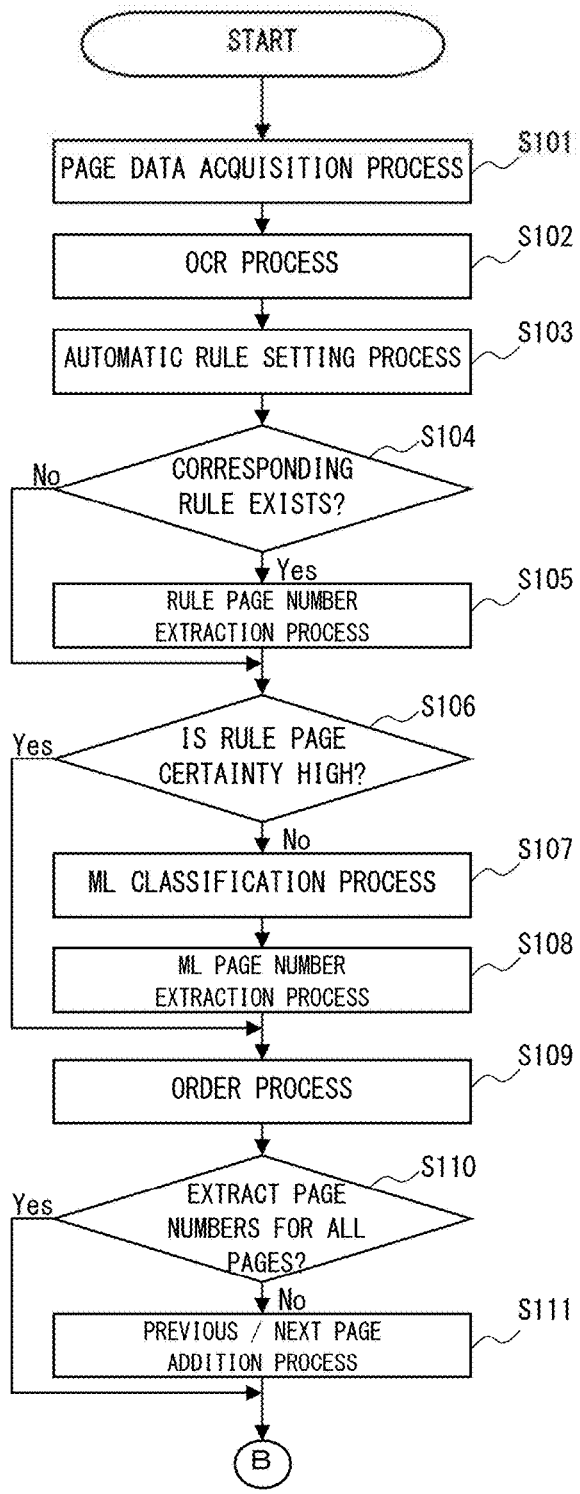
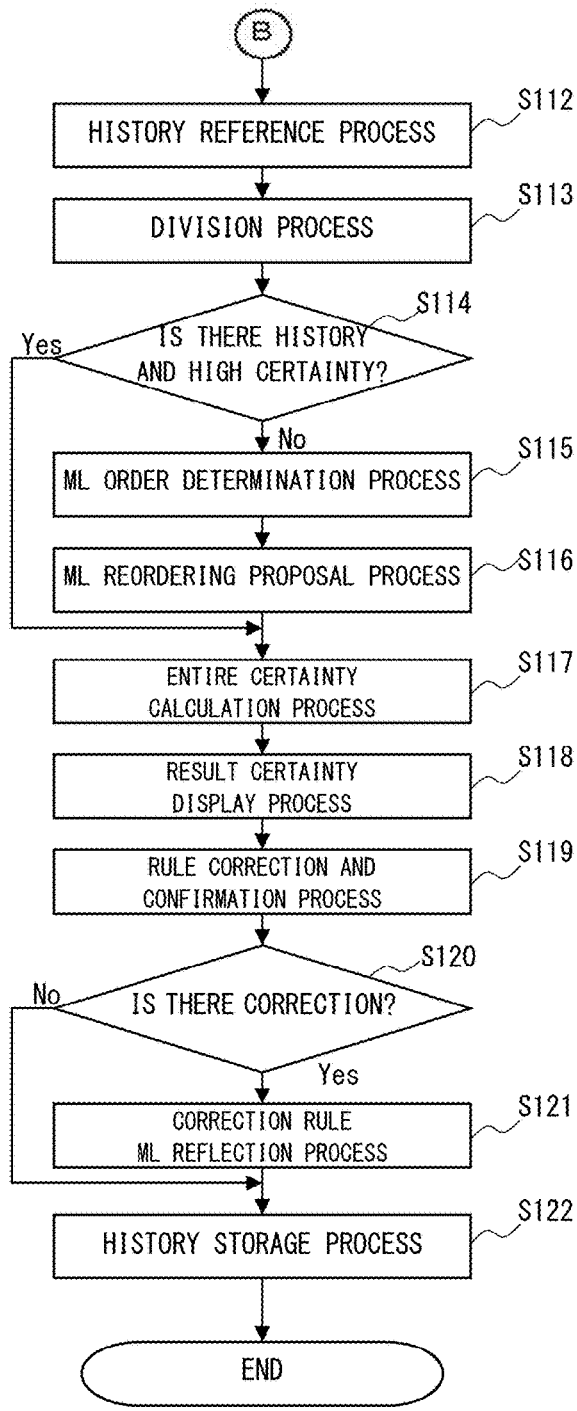

Kyocera  
1234 abc way,  
Tokyo, 123-456  
JP 45678 defg way,  
Osaka, 456-123  
JP Date: 01/01/22 Invoice #: 12345678

| 2 | XXXXXX | 800 |

Total: $800

Page:1

A-1

The quick brown fox jumps over the lazy dog.  
1234567890  
The quick brown fox jumps over the lazy dog.  
1234567890  
The quick brown fox jumps over the lazy dog.  
1234567890

The quick brown fox jumps over the lazy dog.  
1234567890  
The quick brown fox jumps over the lazy dog.  
1234567890  
The quick brown fox jumps over the lazy dog.  
1234567890

The quick brown fox jumps over the lazy dog.  
1234567890  
The quick brown fox jumps over the lazy dog.  
1234567890  
The quick brown fox jumps over the lazy dog.  
1234567890

Page:

A-?

| 2 | XXXXXX | 800 |

Total: $800

Abcdefg thank you for using our service.  
The quick brown fox jumps over the lazy dog.  
1234567890  
The quick brown fox jumps over the lazy dog.  
1234567890

Page:2

Kyocera
1234 abc way,
Tokyo, 123-456
JP
45678 defg way,
Osaka, 456-123
JP
Date: 01/01/22 Invoice #: 12345678
XXXXXX    800
2
Total: $600
Page:1

Page:4

Kyoto ceramic
1234 abc way,
Tokyo, 123-456
JP
45678 defg way,
Osaka, 456-123
JP
Date: 01/01/22
Invoice #: 12345678
XXXXXX    2000
2
Total: $2000
Page:1

VOICE_KYOCERA (1)

ONE

[ ] EXTRACTION [ ] DIVISION
[ ] DIVISION PROPOSAL

OT SET

FIG. 7B

SETTING NAME: IN...

USER RULE: N...

MACHINE LEARNING: [X...

PAGE NUMBER SETTING: N...

FIG. 7C

VOICE_ABC_FACTORY

[ ]EXTRACTION [x]DIVISION
[ ]DIVISION PROPOSAL

DIVIDE FROM MINIMUM OF 1
TO MAXIMUM OF 3

500

SETTING NAME: IN

USER RULE: YE

MACHINE LEARNING: [X
[X

PAGE NUMBER SETTING: DI
TO

The quick brown fox jumps over the lazy dog.
1234567890
The quick brown fox jumps over the lazy dog.
1234567890
The quick brown fox jumps over the lazy dog.
1234567890

The quick brown fox jumps over the lazy dog.
1234567890
The quick brown fox jumps over the lazy dog.
1234567890
The quick brown fox jumps over the lazy dog.
1234567890

FIG. 8B

Kyocera

1234 abc way,
Tokyo, 123-456
JP 45678 defg way,
Osaka, 456-123
JP

Date: 01/01/22  Invoice #: 12345678

| 2 | XXXXXX | | 800 |

| 2 | XXXXXX | | 800 |

Total: $800

Abcdefg thank you for using our service.
The quick brown fox jumps over the lazy dog.

The quick brown fox jumps over the lazy dog.
1234567890
The quick brown fox jumps over the lazy dog.
1234567890
The quick brown fox jumps over the lazy dog.
1234567890

Page:

PAGE COORDINATES
(EXTRACTION IMPOSSIBLE)

Page#:___

F "123456789" IS DETECTED
N COORDINATES
200, 800, 220, 820),
CHANGE CLASSIFICATION TO
'INVOICE_KYOCERA (2)".

FIG. 9A          502

The quick brown fox jumps over the lazy dog.
1234567890
The quick brown fox jumps over the lazy dog.
1234567890
The quick brown fox jumps over the lazy dog.
1234567890

The quick brown fox jumps over the lazy dog.
1234567890
The quick brown fox jumps over the lazy dog.
1234567890
The quick brown fox jumps over the lazy dog.
1234567890

The quick brown fox jumps over the lazy dog.
1234567890
The quick brown fox jumps over the lazy dog.
1234567890
The quick brown fox jumps over the lazy dog.
1234567890

Page:

FIG. 9B

NUMBER OF PAGES: 4

NUMBER OF PAGES: 3

INFORMATION PROCESSING APPARATUS, IMAGE FORMING APPARATUS, AND INFORMATION PROCESSING METHOD FOR EASILY SETTING RULES FOR ORDERING PAGE DATA

BACKGROUND

The present disclosure particularly relates to an information processing apparatus, an image forming apparatus, and an information processing method for processing page data.

There are image forming apparatuses such as multifunction apparatuses (multifunctional peripherals, MFPs) that can print documents and images.

Some of these image forming apparatuses can process a plurality of scanned page data.

As a typical image forming apparatus, an apparatus for collectively processing and aggregating a plurality of different types of form documents is disclosed. This apparatus is an information processing apparatus that extracts document information from scanned images of a plurality of different types of form documents and aggregates them. The first extraction processing means of this apparatus extracts form identification information for identifying the type of form document from the first extraction area set in common with a plurality of form documents. The second extraction processing means extracts the document information from the second extraction area. The second extraction area is set for each type of the form document that is identified based on the form identification information extracted by the first extraction processing means. The aggregation processing means aggregates the document information extracted by the second extraction processing means.

Further, as another typical image forming apparatus, an apparatus that scans a plurality of documents at once, divides the documents into separate files, and recommends a file name, or the like, is described. This apparatus acquires image data of a plurality of documents and divides the image data to create a plurality of files. Further, OCR-related processing is executed, the document of the file and the registered document are matched, and the type of the document is determined. According to the index extraction rule associated with the registered document, the recommendation content related to the index is generated from the document of the file and presented to the user. Then, a modification process of the index and the index extraction rule is performed based on the user's modification instruction. This gives the file an index. Then, the first process including the OCR-related process and the second process including the modification process are processed in parallel.

SUMMARY

An information processing apparatus of the present disclosure is an information processing apparatus for setting a rule for ordering a plurality of page data that is scanned, including: an OCR unit that performs optical character recognition for character and layout in a page for each of the plurality of page data; a rule order unit that classifies each of the plurality of page data based on the page ordering rule according to the characters and the layout that are performed optical character recognition by the OCR unit, extract a page number, and calculate certainty of the page number; and a rule setting unit that presents user with the certainty calculated by the rule order unit and causes the user to set the rule.

An image forming apparatus of the present disclosure is an image forming apparatus for setting a rule for ordering a plurality of page data that is scanned, including: an OCR unit that performs optical character recognition for character and layout in a page for each of the plurality of page data; a rule order unit that classifies each of the plurality of page data based on the page ordering rule according to the characters and the layout that are performed optical character recognition by the OCR unit, extract a page number, and calculate certainty of the page number; and a rule setting unit that presents user with the certainty calculated by the rule order unit and causes the user to set the rule.

An information processing method of the present disclosure is an information processing method executed by an information processing apparatus for setting a rule for ordering a plurality of page data that is scanned, including the steps of: performing optical character recognition for character and layout in a page for each of the plurality of page data; classifying each of the plurality of page data based on the page ordering rule according to the characters and the layout that are performed optical character recognition and extracting a page number; calculating certainty of the page number; presenting user with calculated certainty; and causing the user to set the rule.

BRIEF DESCRIPTION OF THE DRAWINGS

FIG. 3 is a flowchart of an automatic ordering, dividing, and setting process according to the embodiment of the present disclosure;

FIG. 4 is a conceptual diagram of the automatic rule setting process as shown in FIG. 3;

FIGS. 5A and 5B are a drawing split across multiple sheets, specifically, a conceptual diagram of the order process as shown in FIG. 3;

FIGS. 6A-6D are a drawing split across multiple sheets, specically, is a conceptual diagram of the front/rear page addition process, history reference process, and division process as shown in FIG. 3;

FIGS. 7A-7D are a drawing split across multiple sheets, specifically, is a screen example the result certainty display process, and rule correction and confirmation process as shown in FIG. 3;

FIGS. 8A-8D are a drawing split across multiple sheets, specifically, a screen example the result certainty display process, and rule correction and confirmation process as shown in FIG. 3;

9A-9B are a drawing split across multiple sheets, specifically, a screen example the result certainty display process, and rule correction and confirmation process as shown in FIG. 3; and

10A-10D are a drawing split across multiple sheets, specifically, a screen example the result certainty display process, and rule correction and confirmation process as shown in FIG. 3.

DETAILED DESCRIPTION

Embodiment

[System Configuration of Image Forming Apparatus 1]

Figure 1:
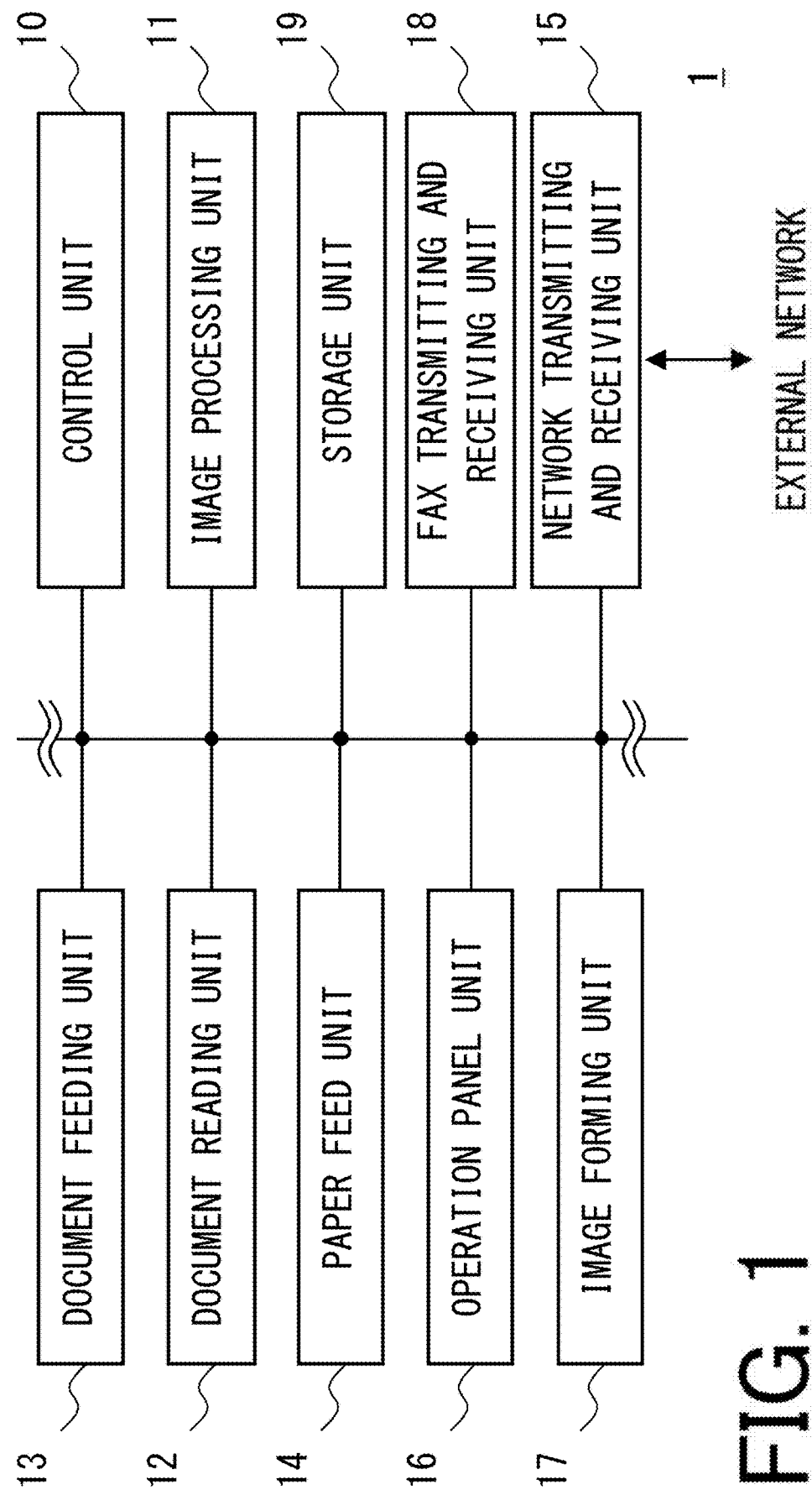
FIG. 1 is a system configuration diagram of an image forming apparatus according to an embodiment of the present disclosure.

Firstly, with reference to FIG. 1, a system configuration of an image forming apparatus 1 is described. The image forming apparatus 1 is an example of the information processing apparatus according to the present embodiment.

The image forming apparatus 1 includes a control unit 10, an image processing unit 11, a document reading unit 12, a document feeding unit 13, a paper feeding unit 14, a network transmitting and receiving unit 15, an operation panel unit 16, an image forming unit 17, a fax transmitting and receiving unit 18, a storage unit 19, and the like. Each unit is connected to the control unit 10 and its operation is controlled by the control unit 10.

The control unit 10 is an information processing unit such as includes a GPP (General Purpose Processor), a CPU (Central Processing Unit), an MPU (Micro Processing Unit), a DSP (Digital Signal Processor), a GPU (Graphics Processing Unit), an ASIC (Application Specific Integrated Circuit, a processor for specific applications), or the like.

The control unit 10 reads out the control program stored in the ROM or HDD of the storage unit 19, expands the control program in the RAM, and executes the control program, so that the control unit 10 can be operated as each part of the functional block as described later. Further, the control unit 10 controls the entire apparatus according to instruction information input from the external terminal or the operation panel unit 16.

image processing unit 11 is a control calculation unit such as a DSP (Digital Signal Processor), a GPU (Graphics Processing Unit), or the like. The image processing unit 11 performs image processing on the image data. This image processing may be, for example, processing such as enlargement/reduction, density adjustment, gradation adjustment, image improvement, or the like.

Further, the image processing unit 11 stores the image read by the document reading unit 12 in the storage unit 19 as print data. At this time, the image processing unit 11 can also convert the print data into an electronic document such as PDF, or the like, or an image data file such as TIFF, or the like. Further, the image processing unit 11 may be capable of executing at least apart of OCR (Optical Character Recognition) processing.

In the present embodiment, the image processing unit 11 may also have an AI (Artificial Intelligence) accelerator function for executing image analysis processing. Specifically, the image processing unit 11 can learn models of various deep learning neural networks and execute calculations of trained models at high speed. In this embodiment, the image processing unit 11 is possible to use various models that perform geometric layout analysis of an image, recognize an area of a document, and recognize characters, tables, and images. Among these, for characters, the image processing unit 11 is possible to perform character recognition by AI, acquire characters and character positions on image data, and perform keyword extraction. For the image, the image processing unit 11 may be possible to use a model that recognizes non-text lines, ruled lines, symbols, logos, and the like.

The document reading unit 12 reads the set document. Further, the document reading unit 12 is arranged on the upper part of the main body part of the image forming apparatus 1.

The document reading unit 12 includes a scanner, a platen glass, and a document reading slit. When reading a document placed on the platen glass, the document reading unit 12 moves the scanner to a position facing the platen glass and scans the document placed on the platen glass to obtain image data. Then, the document reading unit 12 stores the acquired image data in the storage unit 19.

Further, when the document reading unit 12 reads the document supplied from the document feeding unit 13, the document reading unit 12 moves the scanner to a position facing the document reading slit. Then, the document reading unit 12 reads the document through the document reading slit in synchronization with the document transport operation by the document feeding unit 13 to acquire image data. The document reading unit 12 stores the acquired image data in the storage unit 19.

The document feeding unit 13 conveys the document read by the document reading unit 12. The document feeding unit 13 is arranged above the document reading unit 12.

The document feeding unit 13 includes a document placing unit and a document transporting mechanism. The document feeding unit 13 feeds the documents placed on the document loading unit one by one in order by the document transport mechanism and feeds them to the document reading unit 12.

The paper feeding unit 14 feeds the recording paper one by one toward the image forming unit 17. The paper feed unit 14 is provided in the main body part.

The network transmitting and receiving unit 15 is a network connection unit including a LAN board, a wireless transceiver, and the like, for connecting to an external network. The external network according to the present embodiment is, for example, a LAN, a wireless LAN, a WAN, a mobile phone network, a voice telephone network, or the like.

The network transmitting and receiving unit 15 transmits/receives data on a data communication line, and it transmits/receives a voice signal on a voice telephone line.

The operation panel unit 16 includes an input unit such as a button, a touch panel, or the like, and a display unit such as an LCD (Liquid Crystal Display), an organic EL display, or the like. Further, the operation panel unit 16 is arranged on the front side of the image forming apparatus 1.

The buttons of the input unit of the operation panel unit 16 include a numeric keypad, a start button, a cancel button, an operation mode switching button, a button relating to job execution instruction, and the like. In the present embodiment, the operation mode may be copying, fax transmission, scan, network scan, or the like. Further, the type of job may be printing, sending, saving, recording, or the like, for the selected document. In addition, in the present embodiment, it is possible to order and divide the scanned page data 200 (FIG. 2) as a job. The input unit of the operation panel unit 16 acquires instructions for various jobs of the image forming apparatus 1 by the user.

Further, it is also possible to input and change the information of each user according to the user's instruction acquired from the operation panel unit 16.

The image forming unit 17 forms an image on the recording paper from data stored in the storage unit 19, read by the document reading unit 12, or acquired from an external terminal according to the output instruction of the user.

The image forming unit 17 includes a photoconductor drum, an exposure unit, a developing unit, a transfer unit, a fixing unit, and the like. The image forming unit 17 records a toner image on a recording paper by executing an image forming process including charging, exposure, development, transfer, and fixing.

The FAX transmitting and receiving unit 18 transmits/receives a facsimile. The FAX transmitting and receiving unit 18 can receive a facsimile from another FAX apparatus via a voice line, store the received image data in the storage unit 19, and cause the image formation unit 17 to form an image. Further, the FAX transmitting and receiving unit 18 can convert the document read by the document reading unit 12 and the network FAX data transmitted from the external terminal into image data and can facsimile-transmit to another FAX apparatus by voice line.

The storage unit 19 is a non-transitory recording medium such as a semiconductor memory as a ROM (Read Only Memory) or a RAM (Random Access Memory), or the like, or an HDD (Hard Disk Drive), or the like.

A control program for controlling the operation of the image forming apparatus 1 is stored in the ROM or HDD of the storage unit 19. In addition to this, the storage unit 19 also stores the user's account settings. Further, the storage unit 19 may include an area of a storage folder (document box) for each user.

In addition, the control unit 10 and the image processing unit 11 may be integrally formed such as a CPU built-in GPU, a chip-on-module package, an SOC (System On a Chip), and the like.

Further, the control unit 10 and the image processing unit 11 may have a built-in RAM, ROM, flash memory, or the like.

[Functional Configuration of Image Forming Apparatus 1]

Figure 2:
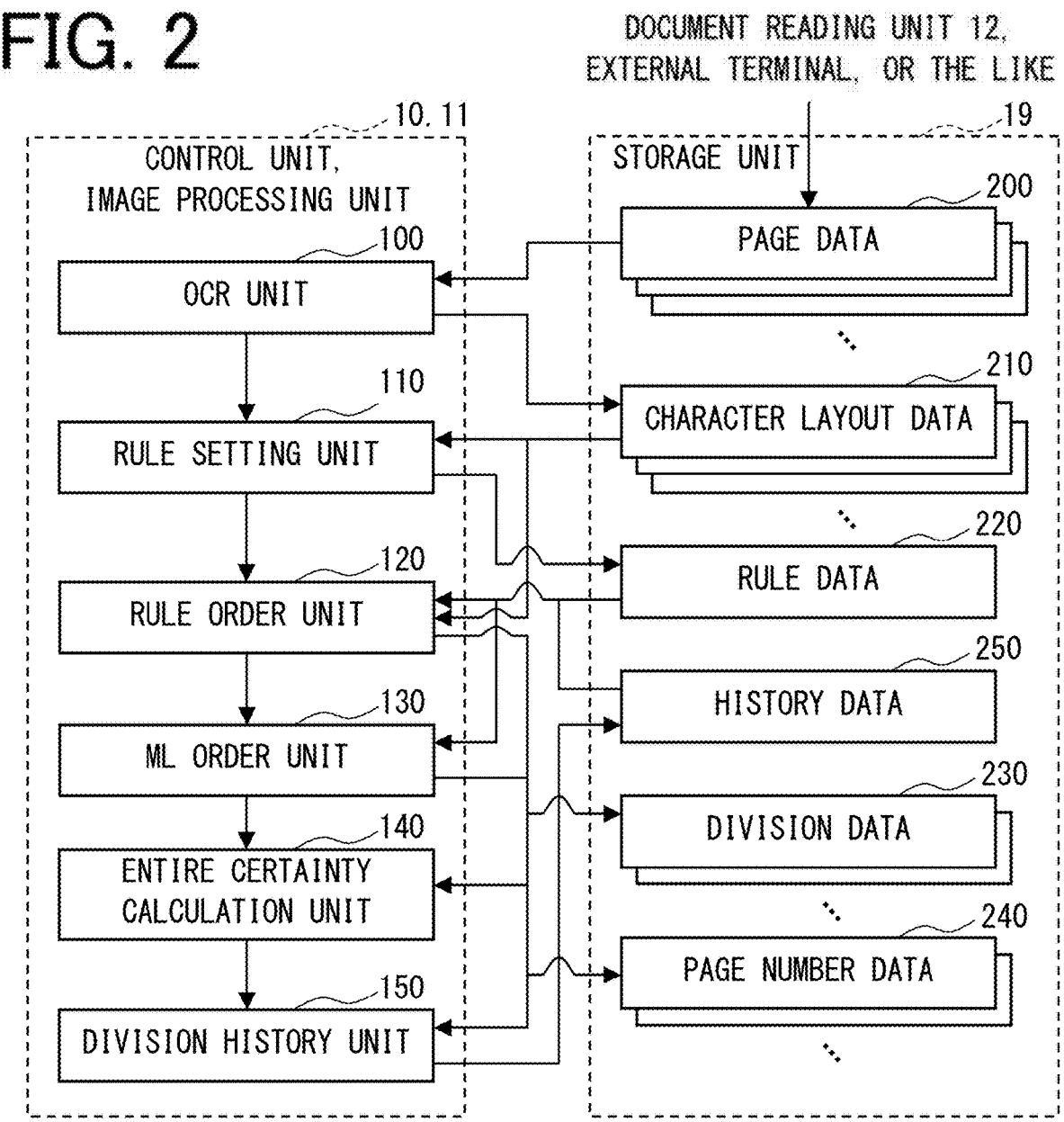
FIG. 2 is a block diagram showing a functional configuration of the image forming apparatus as shown in FIG. 1.

Here, with reference to FIG. 2, the functional configuration of the image forming apparatus 1 is described.

The control unit 10 of the image forming apparatus 1 includes an OCR unit 100, a rule setting unit 110, a rule order unit 120, an ML order unit 130, an entire certainty calculation unit 140, and a division history unit 150.

The storage unit 19 stores page data 200, character layout data 210, rule data 220, division data 230, page number data 240, and history data 250.

The OCR unit 100 performs optical character recognition (Hereinafter, referred to as "OCR") for characters and layouts in each page of the plurality of page data 200. Specifically, the OCR unit 100 performs a geometric layout analysis in the page. If there is a characters, or the like, in the area recognized by this analysis, the OCR unit 100 performs OCR for the characters, or the like.

The rule order unit 120 classifies the characters and layouts performed OCR by the OCR unit 100 based on a page ordering rule, extracts page numbers, and calculates certainty of the page numbers.

Further, the rule order unit 120 divides the plurality of page data 200 into page units to generate the division data 230. At this time, the rule order unit 120 may classify each of the plurality of page data 200 based on the page ordering rule according to the characters and the layouts, which are performed OCR by the OCR unit 100, and it may divide the plurality of page data 200 into page units.

Further, the rule order unit 120 may calculate the certainty of page number extraction and the division certainty from similarity of layout, similarity of fonts, and similarity of the extraction result of page numbers.

Alternatively, the rule order unit 120 can also extract the page number by referring to the history data 250 of the division history stored by the division history unit 150.

Further, the rule order unit 120 can also divide by page with reference to the history data 250 of the division history stored by the division history unit 150.

In addition, the rule order unit 120 calculates the division certainty based on the standard deviation and/or normal distribution of past divisions in the division history.

The ML order unit 130 classifies the page data 200 of pages with low certainty, which is calculated by the rule order unit 120, by machine learning. The ML order unit 130 infers the page number based on this classification and performs division.

Specifically, the ML order unit 130 can perform classification by any one or any combination of a model by using the layout and image data of the page, a model by using the layout and characters, and a model for detecting abnormal value and the certainty of classification result by the rule order unit 120.

Further, the ML order unit 130 can infer a page number and infer a division position based on a model by using the layout and characters. At this time, the ML order unit 130 may infer the page number and the division position based on the certainty in the inference by machine learning.

The rule setting unit 110 classifies each of the plurality of page data 200 by using the layout and the font in the page. On this basis, the rule setting unit 110 can automatically set the rule by extracting the page number based on the coordinates and the character string in the classified page.

Further, the rule setting unit 110 can present the certainty (of page extraction) and the division certainty calculated by the rule order unit 120 to the user and have the user set the rule. At this time, the rule setting unit 110 may also present to the user the inference certainty (of page extraction and division) calculated by the ML order unit 130. Further, the rule setting unit 110 may also present to the user the entire certainty and entire division certainty calculated by the entire certainty calculation unit 140. In addition, the rule setting unit 110 may recalculate each of these certainties based on the rule setting set by the user and present them.

When setting these rules, the rule setting unit 110 can also allow the user to set the rules by using a GUI (Graphical User Interface), or the like.

The entire certainty calculation unit 140 calculates the certainty for each page from the certainty calculated by the rule order unit 120 and the certainty in the inference of the page number extracted by the ML order unit 130. Further, the entire certainty calculation unit 140 can also calculate the certainty of page number extraction in the entire page data 200 and the entire certainty of division from the certainty of each page. Further, the entire certainty calculation unit 140 further calculates division certainty in the division data 230 unit divided by the rule order unit 120 and/or the ML order unit 130.

The division history unit 150 stores the division history of a plurality of page data 200 based on the classification of the characters and layouts performed OCR by the OCR unit 100 for each page as the history data 250. The division history unit 150 stores the page number extraction result and the division position data in association with the data of layouts as the division history.

The page data 200 is data that collects image data scanned by the document reading unit 12. As the image data, it is possible to use image data of various still images such as JPEG (JPG), TIFF, bitmap of RAW (raw), BMP, GIF, PNG, or the like. The page data 200 may be grouped in page units, or they may include data of a plurality of pages. Further, the page data 200 has a high resolution and is in a color, gray scale, or monochrome format, and the ground color, the illumination, and the stains may be removed by an ASIC, or the like. Thus, the page data 200 may be in a state suitable for performing OCR. In addition, the page data 200 may be newly scanned image data, unlike the history data 250 as described later.

Here, in the present embodiment, the page data including the data of a plurality of pages is simply referred to as "the page data 200." On the other hand, in the present embodiment, in the page data 200, when each of the data of a plurality of pages, that is, when indicating only the data of one page, a hyphen is added as in "Page data 200-1 to Page data 200-*n*" to distinguish them. This kind of description method is the same for other data in the present embodiment.

The character layout data 210 is the data that collects layout of the area in the page acquired by OCR (hereinafter referred to as "layout") and the characters in the area acquired by OCR for each of the plurality of pages of the page data 200.

The character layout data 210 may include, for example, the coordinates for each recognized area, the structure of the table, the image, the attributes, the presence/absence of stain, or the like, and other data as the layout of each page in the page data 200. Among these, the coordinates of each area may be indicated by polygon(s) including rectangles. The attributes include color, inversion, underline, border, marking, or the like. The stain, or the like, include part in poor printing condition, or part that are blurred or unclear. Further, the character layout data 210 includes data of OCR recognized characters (character string) and character type (font) in the area including characters on the layout. Among these, for the font, in addition to the type of a specific computer font or printing font, it is possible to specify that it is "handwritten" (the font for the following other data is also possible to be specified to be "handwritten".). Further, the character layout data 210 may also include a labeling result, certainty, and the like, for each of these recognized areas. Among them, the labeling result includes types of recognized document and page, ID (Identification), and the like. Further, the character layout data 210 may include data such as the page number and the division certainty in the entire page data 200, and the page number and the division certainty in the division data 230 unit. Furthermore, the character layout data 210 may include structured data described in a markup language such as XML, or the like. The structured data includes information on forms and tables, information on the areas as described above, page information, scan properties, a language, other meta information, or the like.

The rule data 220 is data where the page ordering rule including page division rules is set. The rule data 220 is automatically set or set by the user. Specifically, the rule data 220 may include layout classification data in the character layout data 210, a rule for extracting page numbers based on the coordinates and character strings in the classified page, and a rule for dividing the page based on the classification, as the page ordering rule. More specifically, for example, the rule data 220 may include data for each group of the plurality of pages (hereinafter, simply referred to as "document") that is possibly to be distinguished by an ID. The data for each "document" includes data such as coordinates, fonts, and the like, of the area where a symbol and a text (character string) that describes the page number and the division indication (references) are included. Further, the rule data 220 may include the layout, type, coordinates, table structure, image type, color, and a keyword in the text of each area. Furthermore, the rule data 220 may include a rule for determining a page number and a division position based on meaning of the text, and the like. The keyword or text also includes macro language designation, a wildcard, regular expression, font, attribute, similarity designation, or the like. In addition to these, the rule data 220 may include rules set by the user in a format such as instructions in a macro language or a natural language. Further, the rule data 220 may also include data on priority between rules, a control command, a variable, and the like. Furthermore, the rule data 220 may include data such as a threshold value of certainty for entrusting the judgment to the ML order unit 130.

The division data 230 is data in which the page data 200 is sorted and divided. That is, in the present embodiment, the division data 230 may be the final output data. Specifically, the division data 230 may be electronic document data such as PDF (Portable Document Format), PS (Postscript), XML (Extensible Markup Language), or the like. In the electronic document data, transparent (invisible) text may be added. Alternatively, the division data 230 may be data of various applications, a database file, or the like. The various applications may be a word processor, a spreadsheet, a presentation software, other dedicated office application, or the like. In the present embodiment, the division data 230 may be a plurality of data for each document ID for one page data 200. That is, the division data 230 may be one or a plurality. Specifically, the division data 230 may be a plurality of files for each document, or one file may be divided for each document. In addition, the division data 230 may have a single page or a plurality of pages.

Further, the division data 230 may include text data, image data, meta data, and other binary data. Among these, the text data may be transparent text included in the above-mentioned electronic document data. Further, the image data may be the same data as the scanned page data included in the original page data 200, or other types of data included in electronic document data such as JPEG, TIFF, GIF, PNG, or the like. Further, the image data may be compressed or uncompressed.

The page number data 240 is index data including page numbers, division positions, division numbers (number of copies), or the like, which is extracted corresponding to each page of the page data 200. The page number data 240 may be generated in accordance with the division data 230.

The history data 250 is data where page data 200 for a sample of ordering, page data 200 previously read in document units, and the like, are sorted in order of the page number. Therefore, in the history data 250, data in the same format as the division data 230 may be collected in document units. In addition, the history data 250 may include data similar to the character layout data 210 associated with the data of each page in the document. In this case, the history data 250 includes the page numbers and the division certainty of each document (division), and the page number and the division certainty of the entire document.

Here, the control unit 10 of the image forming apparatus 1 executes the control program stored in the storage unit 19, and it is made to function as the OCR unit 100, the rule setting unit 110, the rule order unit 120, the ML order unit 130, the entire calculation unit 140, and the division history unit 150.

Further, each part of the above-mentioned image forming apparatus 1 becomes a hardware resource for executing the information processing method according to the present disclosure.

In addition, a part or any combination of the above-mentioned functional configurations may be configured in terms of hardware or circuit by IC, programmable logic, FPGA (Field-Programmable Gate Array), or the like.

[Automatic Ordering, Dividing, and Setting Process by Image Forming Apparatus 1]

Next, with reference to FIGS. 3 to 7, automatic ordering, dividing, and setting process by the image forming apparatus 1 according to the embodiment of the present disclosure is described.

In the automatic ordering, dividing, and setting process according to the present embodiment, by performing the layout of the document or referring to history and comparing it with similar documents in the past, or the like, and by using specific information, the page specification and division based on the rule are performed, automatically. On the other hand, it is troublesome for the user to create and recreate the rule for each document type. For this reason, machine learning is also used to assist page identification and division when the rule is not created or when processing fails due to the rule.

In the automatic ordering, dividing, and setting process of the present embodiment, the control unit 10 mainly executes the program stored in the storage unit 19 in cooperation with each unit and uses the hardware resources.

Hereinafter, with reference to the flowchart of FIG. 3, the details of the automatic ordering division and the setting process is described step by step.

(Step S101)

Firstly, the rule setting unit 110 performs page data acquisition process.

Here, the user places the document on the document placing unit of the document feeding unit 13, and the user instructs for reading, ordering, and dividing the document by using operation panel unit 16. At this time, the user can set the format of the page data 200 generated after reading, the presence/absence of an image, and the like. The format of the page data 200 may include a file format, setting of color, partial color, or black-and-white, resolution setting, printing and transmission setting, and the like. Further, as the format of the page data 200, it is possible to set whether or not to delete handwritten comments, figures, highlighted markers, and the like. After acquiring these settings and instructions, the rule setting unit 110 causes the document reading unit 12 to read the document and stores the page data 200 in the storage unit 19.

Alternatively, the rule setting unit 110 may acquire the already scanned page data 200 from an external terminal, a document box, a flash memory card, or a USB memory connected to the operation panel unit 16, or the like.

Otherwise, the rule setting unit 110 may collectively store the image data received by the fax transmitting and receiving unit 18 in the storage unit 19 as page data 200.

(Step S102)

Then, the OCR unit 100 performs an OCR process.

Here, at first, the OCR unit 100 performs a geometric layout analysis by using, for example, various models of AI of the image processing unit 11. Specifically, the OCR unit 100 uses the image processing unit 11 to acquire, for example, the ground color, recognize the page margins of each page of the page data 200, and recognize the layout. In this layout recognition, for example, the OCR unit 100 recognizes a group of characters and images as an area by differential processing, or the like. The OCR unit 100 can recognize the area based on a blank, an outline, and geometric information.

On this basis, the OCR unit 100 classifies the recognized area. Specifically, the OCR unit 100 classifies and analyzes areas into any one or any combination of text (character(s), character string), a table, and an image. At this time, the OCR unit 100 also analyzes the certainty of the area, the state of the area, and the like. The OCR unit 100 can recognize whether the area is in color, partial color, or monochrome as the state of the area. Further, the OCR unit 100 can recognize the presence or absence of stain, or the like, as the state of the area.

The OCR unit 100 sets the data of these analysis results for the page data 200 in the character layout data 210 together with the coordinate data of the area(s).

For each area, if the area is classified into text, the OCR unit 100 grasps the state of columns, paragraphs, and lines, and recognizes the part of characters. At this time, the OCR unit 100 calculates the certainty of recognition of each character. Further, the OCR unit 100 can also acquire fonts and attributes. In addition, when the area is a table, the OCR unit 100 recognizes parts of forms and characters as a table structure, for example. On this basis, in each case, the OCR unit 100 performs OCR for the character part. In the case of an image, the OCR unit 100 can also recognize non-text lines, symbols, illustrations, logos, photographs, and the like.

The OCR unit 100 also sets the recognition result of characters, and the like, for each of these areas and the certainty thereof in the character layout data 210.

(Step S103)

Next, the rule setting unit 110 performs the automatic rule setting process.

The rule setting unit 110 automatically specifies a rule for extracting a page number and a rule for division (page division rule) as the page ordering rule by using specific information such as a layout corresponding to the page data 200, "sample" data, and similar documents, or the like, in the past. The rule setting unit 110 set the specified page ordering rule to the rule data 220.

Specifically, the rule setting unit 110 may read the page data 200 to be sorted (ordered) and divided as usual, and automatically set the rule from the page data 200.

Alternatively, the rule setting unit 110 may acquire the page data 200 as a "sample" and execute the automatic setting of the above-mentioned rule. In this case, the user may instruct to read the "sample" data from the operation panel unit 16 or an external terminal for setting the rule.

Alternatively, the rule setting unit 110 may use the history data 250 to classify the data of similar documents in the past and automatically set the rules.

In this embodiment, an example of automatically generating the rule by using the character layout data 210 itself generated from the page data 200 is described.

For example, the rule setting unit 110 classifies each page of the page data 200 by using the layout and the font in the page performed OCR by the OCR unit 100.

Here, the rule setting unit 110 calculates the similarity between the layout and the font among a plurality of pages, and it classifies them based on the same rules as the page ordering rule by the rule order unit 120 as described later. At this time, the rule setting unit 110 can classify each page of the character layout data 210 by associating it with the page in the page data 200, for example. The rule setting unit 110 sets the layout data of each classified page in the rule data 220 by associating them with an ID (Identification) or an index. Here, the layout of each classified page does not have to be arranged in the same order as the page. Further, the rule data 220 may also be set with an index to the corresponding page of the character layout data 210. As a result, if there is a similar layout in the page data 200, it is possible to classify the same page.

On this basis, the rule setting unit 110 specifies a rule for extracting the page number based on the coordinates and the character string in the classified page. The rule setting unit 110 extracts, for example, a character string indicating a page number in the corresponding page of the page data 200 according to the layout in the classified character layout data 210. If the character string indicating the page number is extracted, the rule setting unit 110 acquires the coordinate and font of the area having the character string of the page number (hereinafter referred to as "page number area"). The rule setting unit 110 set the rule for extracting the page number in the rule data 220 in association with the classified layout based on these coordinate and font.

Further, the rule setting unit 110 can also specify a page division rule based on this classification. For example, the rule setting unit 110 can specify a page division rule such that the layout in the classified layout data is divided when the increased page number is reduced, or the like. Also in this case, the rule setting unit 110 can set the specified page division rule in the rule data 220 in association with the layout data of the division position.

Figure 4:
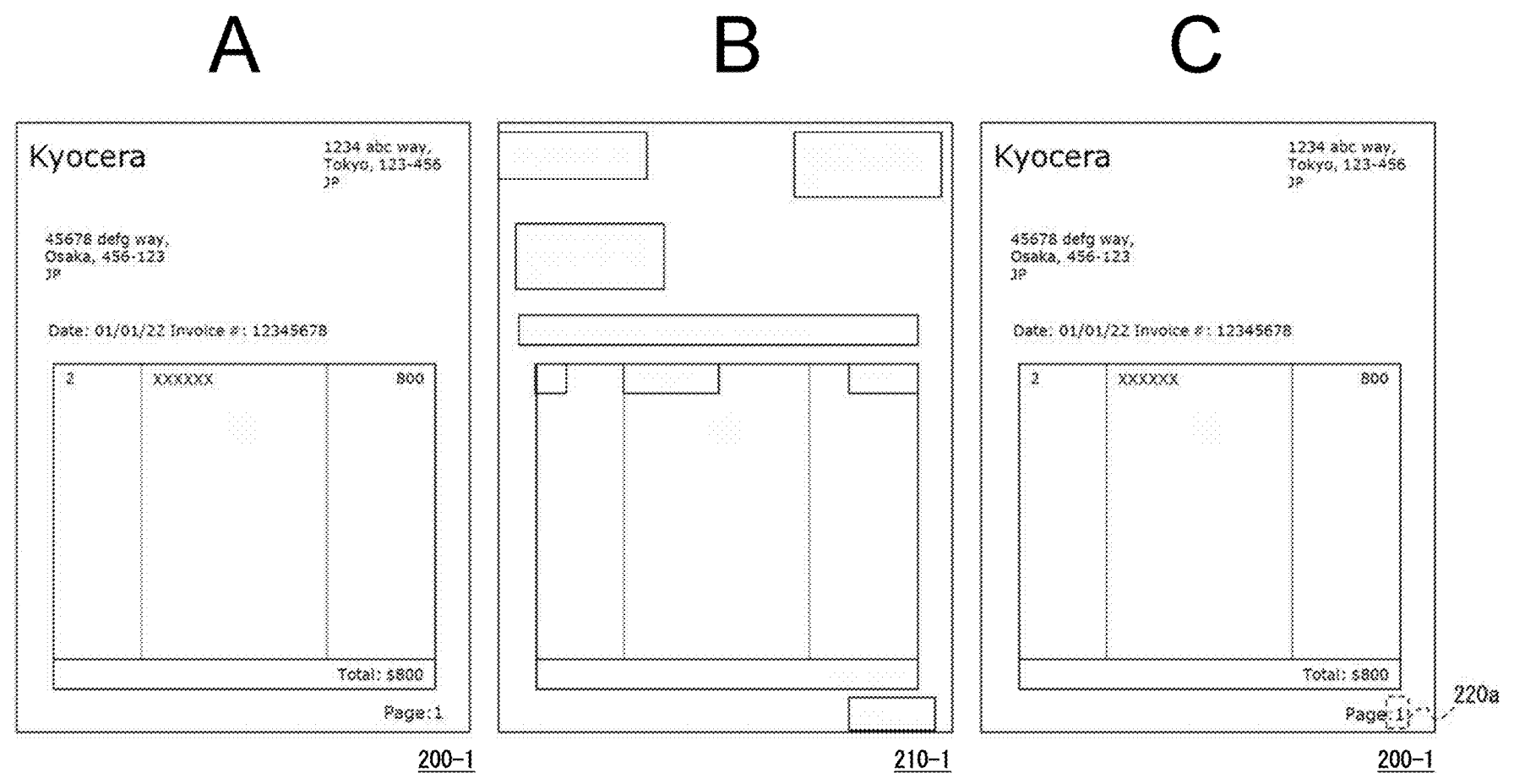

As refer to FIG. 4, an example of automatic rule setting of the page number is described.

Element A in FIG. 4 shows an example of one page of a document as page data 200-1.

Element B in FIG. 4 is an example of a classified layout of the document. Here, the characters and the layout performed OCR in the page of the page data 200-1 of element A is set in the character layout data 210-1. In this example of the character layout data 210-1, each area is shown as a rectangular bounding box. In these areas, the rule setting unit 110 specifies the page number by using the coordinates and the character string.

Element C in FIG. 4 is an example of specifying a rule for extracting page numbers. The rule setting unit 110 sets the classification by using the layout information and the font information of the character layout data 210-1. On this basis, the rule setting unit 110 specifies the rule for extracting page number. Here, as shown in the rule data 220*a*, a rule, which the numerical value after "Page:" in the page number area is the page number, is set.

(Step S104)

Then, the rule order unit 120 determines whether or not the corresponding rule exists.

After the page number rule is automatically set as described above, the rule order unit 120 extracts the actual page number for each page of the page data 200 based on the set rule data 220.

Here, the rule order unit 120 refers to the character layout data 210 associated with each page of the page data 200 that is actually to be ordered, and the rule data 220 corresponding to this character layout data 210. Then, the rule order unit 120 determines Yes if the rule for extracting the page number is set. In other cases, the rule order unit 120 determines No.

In the case of Yes, the rule order unit 120 advances the process to step S105.

In the case of No, the rule order unit 120 advances the process to step S106.

(Step S105)

If the corresponding rule exists, the rule order unit 120 performs the rule page number extraction process.

The rule order unit 120 refers to the rule data 220 and extracts the page number based on the set rule. At the time of extracting the page number, the rule order unit 120 also calculates the "certainty" of the extraction of the page number.

The rule order unit 120 classifies the page of the page data 200 (hereinafter, referred to as "order page") from which the page number is actually extracted based on the page ordering rule. At this time, the rule order unit 120 refers to the character layout data 210 and uses the characters and layout performed OCR by the OCR unit 100. On this basis, the rule order unit 120 can calculate the certainty from the similarity of the layout, the similarity of the font, and the similarity of the recognition result of the page number.

Specifically, for example, as classification, the rule order unit 120 searches the layout closest to the layout of the character layout data 210 corresponding to the order page of the page data 200 (hereinafter, referred to as "order layout"). Hereinafter, the layout closest to the order layout is referred to as "approximate layout". At the time of this search, the rule order unit 120 compares the order layout with the layout set in the rule data 220 to search for the approximate layout. The rule order unit 120 extracts the page number from the recognition result of the character string in the page number area of the order page based on the rule set in the rule data 220 for the searched approximate layout.

At this time, the rule order unit 120 compares the order layout with the approximate layout. Specifically, for example, the rule order unit 120 calculates the certainty based on the similarity of the coordinates and sizes of each area, the similarity of the fonts in the page number area, and the similarity of the recognition result as the result of the comparison. More specifically, the rule order unit 120 calculates, for example, the certainty of page extraction (hereinafter referred to as "rule page certainty") by the following equation (1).

$$\text{Rule page certainty} = (\text{Similarity of coordinates and size of each area}) + (\text{Similarity of font: Similar as "1" or Dissimilar as "0"}) + (\text{Similarity of recognition result}) \quad \text{Equation (1)}$$

Here, the similarity of the recognition results may be a value indicated by (error of character coordinates)×(numerical value or not: "1" or "0").

In this way, the rule order unit 120 is possible to calculate the rule page certainty so that the similarity between layouts, the similarity of fonts, and the similarity of recognition results increase with respect to the extraction of page numbers.

(Step S106)

Next, the ML order unit 130 determines whether or not the rule page certainty is high as a result of the rule page number extraction process. The ML order unit 130 determines Yes if the rule exists, the page number is possibly extracted by the rule, and the rule page certainty is higher than a specific threshold value (hereinafter, this threshold value is referred to as "rule page threshold value"). The ML order unit 130 determines No in other cases, that is, if the corresponding rule does not exist, or if the page number is possibly extracted by the rule but the rule page certainty is lower than the rule page threshold value.

In the case of Yes, the ML order unit 130 advances the process to step S109.

In the case of No, the ML order unit 130 advances the process to step S107.

(Step S107)

If the rule does not exist or the certainty of the rule page is low, the ML order unit 130 performs the ML classification process.

The ML order unit 130 classifies the page data 200 having a low rule page certainty by machine learning.

Here, firstly, the ML order unit 130 is possible to classify the order pages by using various models for page classification by machine learning as a classification algorithm.

In the present embodiment, the ML order unit 130 performs classification by any one or any combination of models of, for example, a model by using image data of layout and page, a model by using layout and characters (character string), and a model to detect abnormal value and certainty of classification result by rule order unit 120.

Specifically, the ML order unit 130 uses, for example, a CNN (Convolution Neural Network), a Transformer, or the like, and it can be classified by a deep learning model by using layout information and image information.

Alternatively, the ML order unit 130 uses, for example, LSTM (Long Short-Term Memory), Transformer, or the like, and it can be classified by a deep learning model by using layout information and character string information.

Further, the ML order unit 130 uses, for example, kNN (k-Nearest Neighbor), GMM (Gaussian Mixture Model), or the like, in addition to the above-mentioned model, it is also possible to detect unknown classification by using abnormal value detection and certainty of classification result.

(Step S108)

Then, the ML order performs the ML page number extraction process.

The ML order unit 130 infers the page number based on the classification by machine learning.

In this embodiment, the ML order unit 130 infers the page number based on the classification of each model of the above-mentioned machine learning.

In the present embodiment, the ML order unit 130 can infer the page number based on, for example, a model by using a layout and characters.

Specifically, the ML order unit 130 uses, for example, LSTM, Transformer, or the like, infers a page number by a deep learning model by using layout information and character string information, and outputs this as a page number extraction result.

The ML order unit 130 can output the certainty calculated at the time of inference by these machine learning models (hereinafter, the certainty of the inference of the page number output by the ML order unit 130 is "ML page certainty".).

Further, the ML order unit 130 may not output the value of the extraction result of the page number when the ML page certainty calculated by this machine learning model is equal to or less than the page inference threshold value, which is set by the administrator, or the like.

In addition, if the page number character string does not exist in the document in the first place, the ML order unit 130 may skip this step.

Here, the processes from step S101 to step S108 can be performed in parallel by multi-threading, SIMD (Single Instruction/Multiple Data), or the like.

(Step S109)

Here, the rule order unit 120 performs an order process.

The rule order unit 120 refers to the rule data 220 and sorts (arranges, orders) the pages based on the page numbers extracted by the rule order unit 120 or the ML order unit 130.

As refer to FIG. 5, the order process is described. In this figure, at the bottom of each page of the page data 200, the classification ID "A" extracted by the rule order unit 120 or the ML order unit 130 and the page number are shown.

Firstly, the rule order unit 120 orders each page in the order of page numbers of the same classification. Here, the page "A-1" is moved to the front of the page "A-2".

Next, when the page number is unknown, the rule order unit 120 moves the page next to the page having the closest layout at the time of classification. In this example, page "A-?" is next to page "A-2", which is the closest layout, and thus it is placed as it is.

Next, since the page "A-3" does not exist, the rule order unit 120 moves the page "A-4" to a place one space away from the page "A-2".

Here, the rule order unit 120 does not move the page "A-1b" to the front of the page "A-2". This is because the layout of page "A-1" is closer than that of page "A-2".

Further, since the classification itself of the page "?-?" is unknown, the rule order unit 120 orders the page "?-?" after the classification "A" without changing the original order.

The rule order unit 120 sets these orders in the page number data 240.

(Step S110)

Next, the rule order unit 120 determines whether or not the page numbers can be extracted for all pages. The rule order unit 120 determines Yes if the page numbers can be extracted on all pages. The rule order unit 120 determines No in other cases, that is, if there is at least a page for which the page number cannot be extracted. In the example of FIG. 5, if there is something like "A-?" or "?-?" on the page, the rule order unit 120 is determined as No.

In the case of Yes, the rule order unit 120 advances the process to step S112 (as shown toward to "B" in the drawing).

In the case of No, the rule order unit 120 advances the process to step S111.

(Step S111)

If there is one or more page for which the page number cannot be extracted, the rule order unit 120 performs the previous/next page addition process.

The rule order unit 120 assigns a page number of the page, which the page number cannot be extracted, by the previous and next page numbers.

As explained with reference to FIG. 6, the rule order unit 120 infers the page number of the page "A-?" from the numbers before and after. Specifically, the rule order unit 120 sets the page "A-?" to the page "A-3" in the page number data 240. This is because the page "A-?" is sandwiched between the page "A-2" and the page "A-4".

Next, the rule order unit 120 advances the process to step S112 (as shown toward to "B" in the drawing).

(Step S112)

Here, the rule order unit 120 performs history reference process.

The rule order unit 120 refers to the history data 250, which is stored in the storage unit 19 by the division history unit 150, in order to estimate the division position.

As a result, the rule order unit 120 estimates the division position by comparing with the result of the division of the past page data 200.

Specifically, the rule order unit 120 searches for whether or not there is a document divided in the past by the same rule as the rule for dividing the page in the rule data 220. Therefore, the rule order unit 120 compares with the number of pages of each document in the history data 250 according to the ordered page number data 240, and it estimates the page number to be the division position.

Figure 6A:
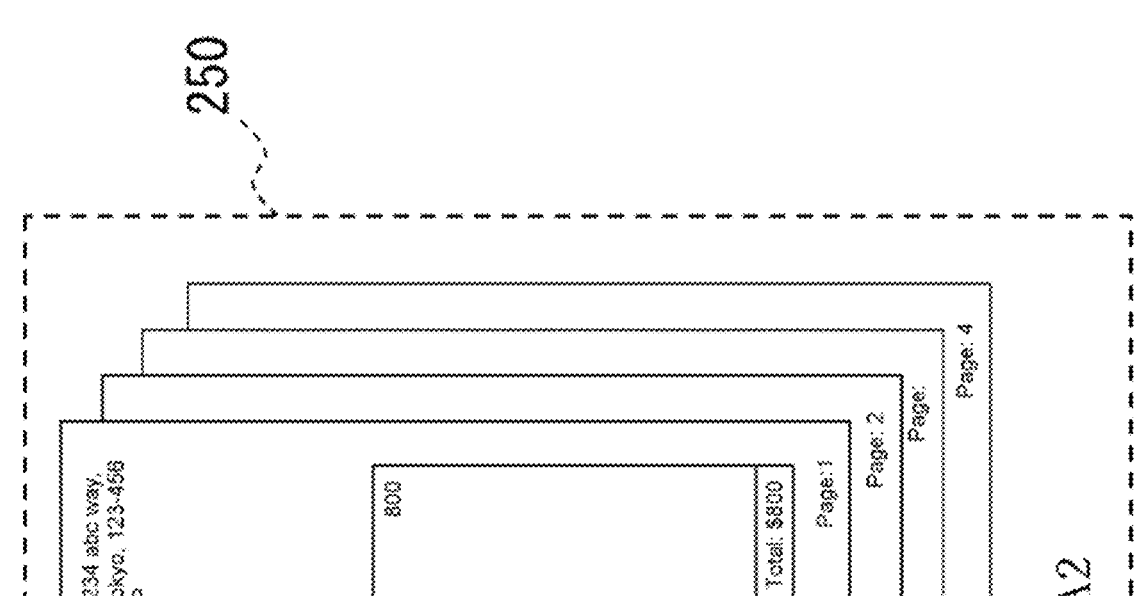
Figure 6B:
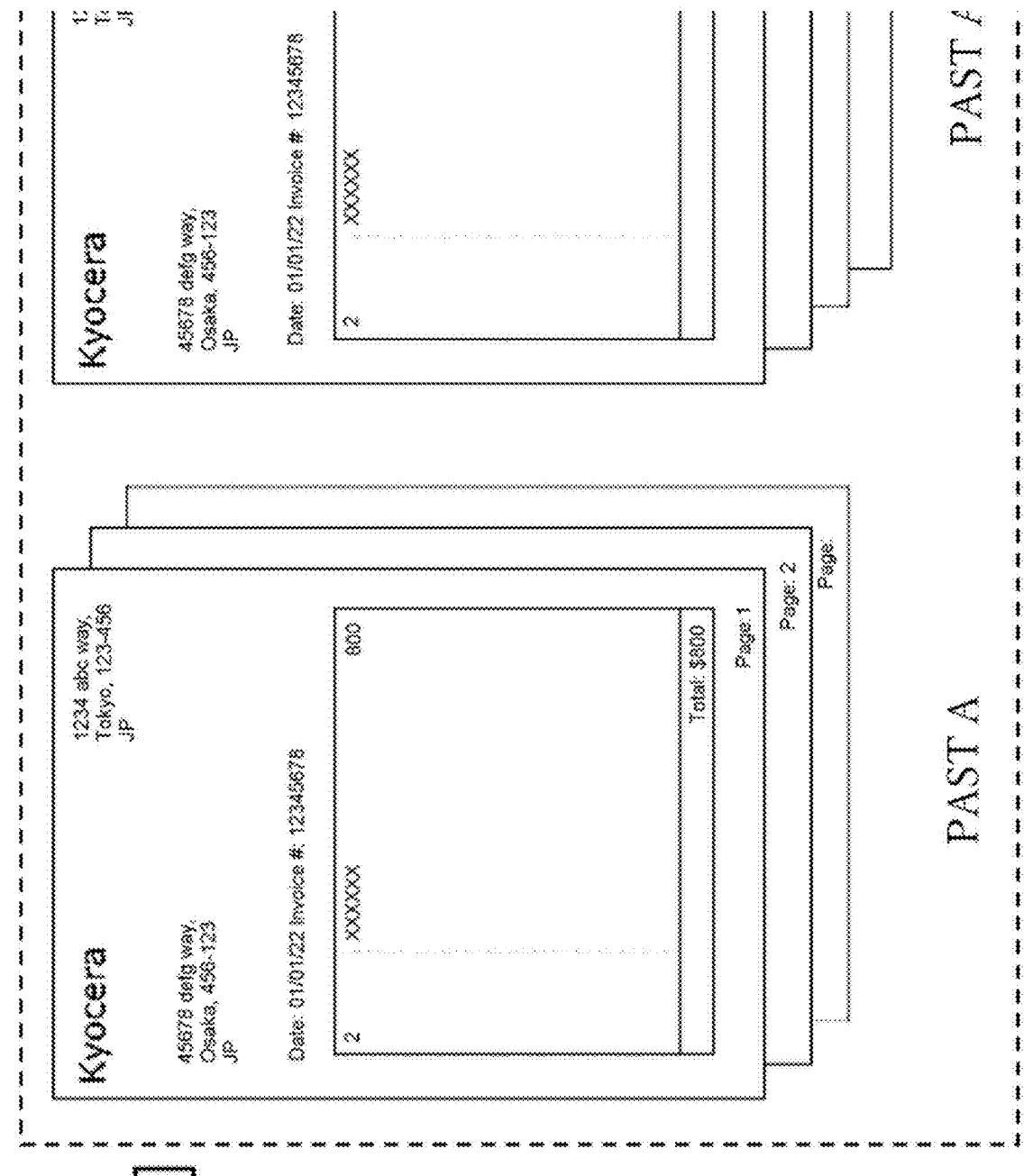
Figure 6C:
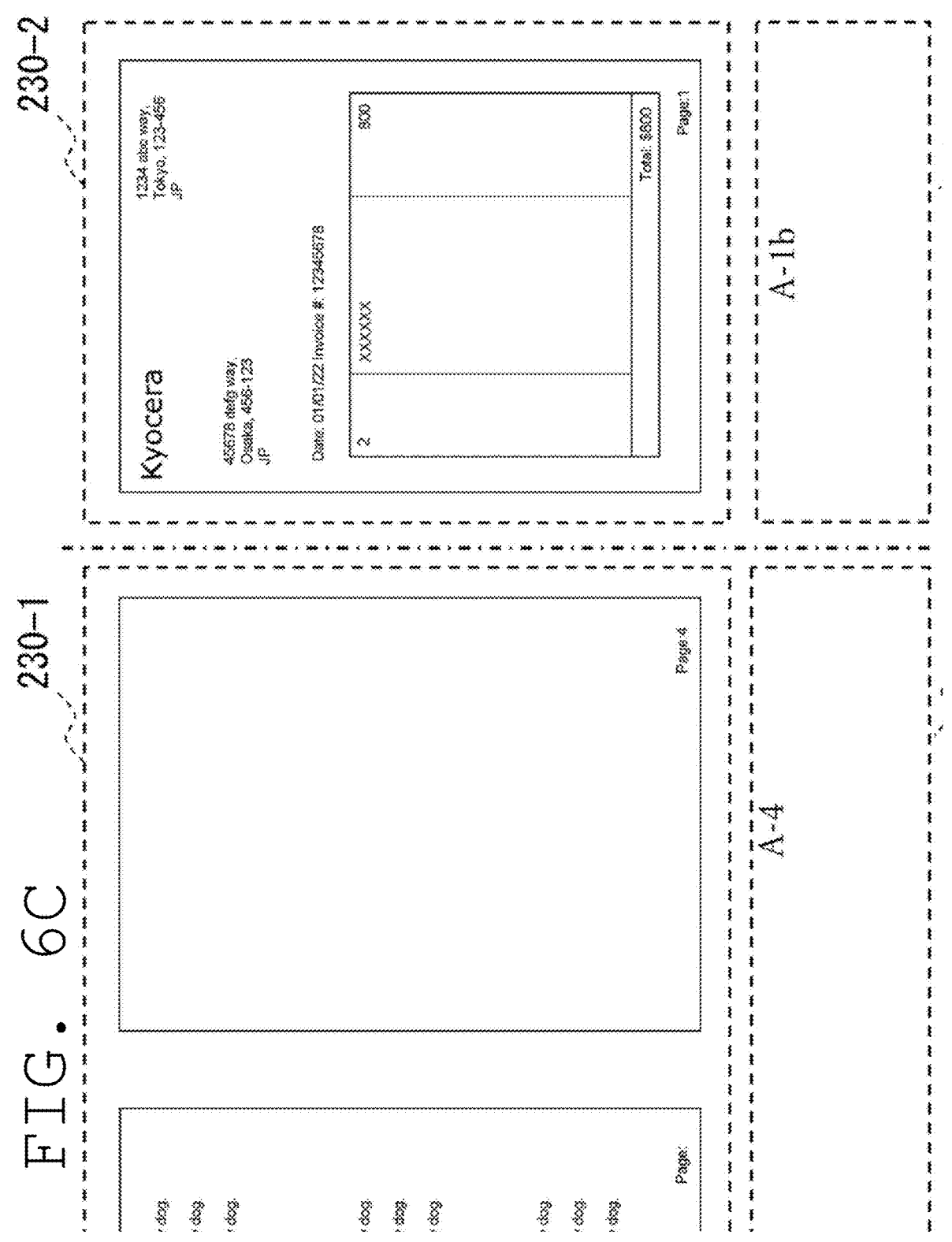
Figure 6D:
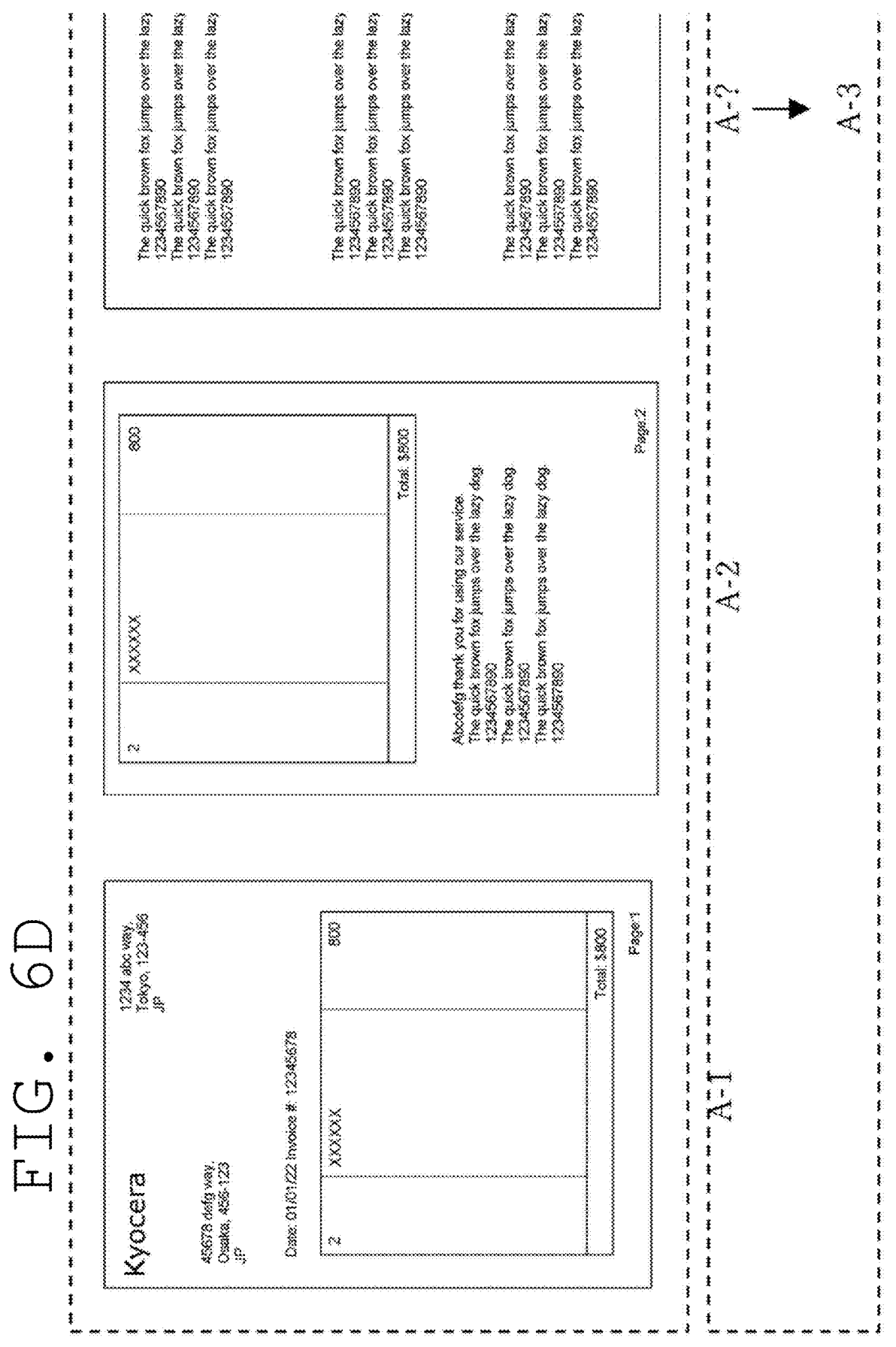

In the example of FIG. 6, the document "past A" in the history data 250 has three pages and the document "past A2" has four pages. Therefore, the rule order unit 120 estimates that it is divided into three or four pages from such the past document.

(Step S113)

Then, the rule order unit 120 or the ML order unit 130 performs the division process.

Firstly, the rule order unit 120 can be divided according to the rules for ordering pages by characters and layout for each classification of page data 200.

Specifically, the rule order unit 120 can refer to, for example, the page division rule of the rule data 220 and divide the page number data 240 if the increased page number decreases. That is, if the page number in ascending order becomes smaller than the previous one, the rule order unit 120 may determine as the division position and divide the page data 200.

In the example of FIG. 6, since the page "A-4" is followed by the page "A-1b", the rule order unit 120 determines here as a division position and divides at the position. As a result, the rule order unit 120 generates the division data 230-1 from the page "A-1" to the page "A-4" and the division data 230-2 only for the page "A-1b". At this time, the rule order unit 120 also generates the page number data 240-1 and the page number data 240-2 in accordance with the division.

Alternatively, the rule order unit 120 can also divide the page data 200 in page units by referring to the division history in the history data 250 as described above.

Specifically, the rule order unit 120 calculates the similarity of the layout, the similarity of the font, and the similarity of the extraction result of the page number, and it may divide the page data 200 at the position where the combination of these similarity becomes the maximum value.

Alternatively, the rule order unit 120 can calculate the probability density of the degree of similarity in the page number data 240 and divide the page data 200 at a position where the maximum value of the probability density is reached.

In the example of FIG. 6, the rule order unit 120 estimates that it is divided into three or four pages by the past document as described above. Therefore, the rule order unit 120 compares the page "A-1" to the fourth page "A-4" with the corresponding page of the document in the history data 250, and it divides at the position.

At this time, the rule order unit 120 calculates the division certainty (hereinafter referred to as "rule division certainty") based on the standard deviation and/or the normal distribution of the past division in the division history.

For example, the rule order unit 120 compares the layout of each page of each document with the layout corresponding to the page number of the page number data 240, and it calculates the rule division certainty.

Specifically, the rule order unit 120 calculates the rule division certainty by the similarity of the layout, the similarity of the font, and the similarity of the page number extraction result as described above.

Further, the rule order unit 120 can calculate how far the calculated rule division certainty is from the average and determine whether to use machine learning or not.

Specifically, the rule order unit 120 may calculate the rule division certainty corresponded to each document in the history data 250 based on the standard deviation or the normal distribution. On this basis, if the deviation of the rule division certainty is within the standard deviation±1σ interval and the certainty is equal to or less than the threshold value, or the like, it may be determined that the division is to be performed by the ML order unit 130.

Here, the ML order unit 130 may perform division based on the inference certainty by machine learning.

In the present embodiment, the ML order unit 130 classifies the page data 200, which has a low rule division certainty, by machine learning and then divides the page data 200.

Specifically, the ML order unit 130 classifies by any one or any combination of the model by using layout and image data of a page, the model by using layout and characters, and a model for detecting abnormal values and certainty of classification results by rule order unit 120. This is similar to the page number inference described above. On this basis, the ML order unit 130 infers the division position based on the model by using the layout and characters. The ML order unit 130 can output the output of the model calculated at this time as the division certainty (hereinafter, this certainty is referred to as "ML division certainty").

In addition, as is described later, whether the page number is extracted or divided by the ML order unit 130 may be set in the rule data 220 for each document by the user.
(Step S114)

Next, the rule order unit 120 determines whether or not there is a history and the certainty is high. The rule order unit 120 determines Yes if there is the history data 250 and the rule page certainty or the ML page certainty, and the rule division certainty or the ML division certainty are equal to or higher than the threshold value for ordering determination. The threshold value for this ordering determination can be appropriately set and adjusted by the administrator, or the like. The rule order unit 120 determines No in other cases, that is, if there is no history or any of the above-mentioned certainty is smaller than the threshold value for the ordering determination.

In the case of Yes, the rule order unit 120 advances the process to step S117.

In the case of No, the rule order unit 120 advances the process to step S115.
(Step S115)

If there is no history and/or any one of certainty is smaller than the threshold value for ordering determination, the ML order unit 130 performs the ML order determination process.

The ML order unit 130 determines page ordering by machine learning.

Specifically, the ML order unit 130 uses a deep learning algorithm by using image information and time-series information such as CNN, LSTM, or the like. Thus, the ML order unit 130 infers whether the ordering of the images on the page and the division position are correct for each division data 230. Here, the ML order unit 130 outputs the value of this estimation result as the certainty of the page ordering determination.
(Step S116)

Next, the ML order unit 130 performs the ML reordering proposal process.

The ML order unit 130 may execute each algorithm similar to the above for all combinations of each page of each division data 230. As a result, the ML order unit 130 may propose an ordering with the highest certainty of page ordering determination and division (hereinafter referred to as "reordering"). The user can select to apply this reordering proposal in the result certainty display process as described later.

In addition, it is possible to set whether or not to perform the reordering as the reordering mode by the user. That is, since the processing load may increase, the user can select whether or not to execute the reordering proposal.
(Step S117)

Here, the entire certainty calculation unit 140 performs the entire certainty calculation process.

The entire certainty calculation unit 140 calculates the entire certainty of the page data 200.

Here, the entire certainty calculation unit 140 calculates the entire certainty by using each certainty calculated from the result of page number extraction and division.

Specifically, the entire certainty calculation unit 140 can calculate the certainty of the page from the rule page certainty and the ML page certainty. On this basis, the entire certainty calculation unit 140 can calculate the certainty of the division data 230 by averaging the certainty of each page in the division data 230 units. Further, the entire certainty calculation unit 140 is also possible to average all the pages of all the page data 200 and calculate the entire certainty of the page data 200.

In addition, the entire certainty calculation unit 140 can further calculate the division certainty of the division data 230 from the rule division certainty and the ML division certainty. Further, the entire certainty calculation unit 140 can also calculate the entire division certainty from the division certainty of all the division data 230.

More specifically, the entire certainty calculation unit 140 can calculate the certainty for each page, for example, by using the following equation (2):

(Certainty for each page)={(Larger Value of Rule page certainty and ML page certainty)+(Larger Value of Rule division certainty and ML division certainty)}/2    Equation (2)

In addition, the entire certainty calculation unit 140 may incline each certainty.

Further, the entire certainty calculation unit 140 may calculate the entire certainty of the page data 200 by using iOU (Intersection over Union, union of region, intersection of region), or the like.

Further, each certainty does not necessarily have to be the same calculation method as described above.

(Step S118)

Next, the rule setting unit 110 performs division result certainty display process.

The rule setting unit 110 presents the certainty calculated by the rule order unit 120 to the user and causes the user to set the rule.

In addition, the rule setting unit 110 also presents to the user the certainty calculated by the ML order unit 130. At this time, the rule setting unit 110 can also present the certainty of the ordering determination and the ordering proposal.

Further, the rule setting unit 110 also presents to the user the certainty of each page calculated by the entire certainty calculation unit 140.

The rule setting unit 110 can display and present these on the display unit of the operation panel unit 16 or the external terminal by GUI.

(Step S119)

Next, the rule setting unit 110 performs rule correction and confirmation process.

The rule setting unit 110 can modify the rule and confirm the ordering and the division.

Here, the rule setting unit 110 can cause the user to set the rule with the GUI and display a screen for confirming the result of the actual ordering and division.

On this basis, the rule setting unit 110 sets the rule modified by the user in the rule data 220.

FIGS. 7-10 show an example of a GUI screen for modifying and confirming the rule.

FIG. 7 shows a screen example 500 of setting management. Here, the rule setting unit 110 shows and sets the image of the first page for each document of the rule data 220. Thus, it is possible to set the setting name (ID), the presence/absence of the user-specific rule set by the user (hereinafter simply referred to as "user rule"), and the presence/absence of page extraction, division, and division proposal (ordering proposal) by the machine learning. Furthermore, it is possible to set the number of pages and the number of pages to be divided. In the screen example 500, it is possible to transition to the rule setting screen by pressing the image on this page.

Figure 8D:
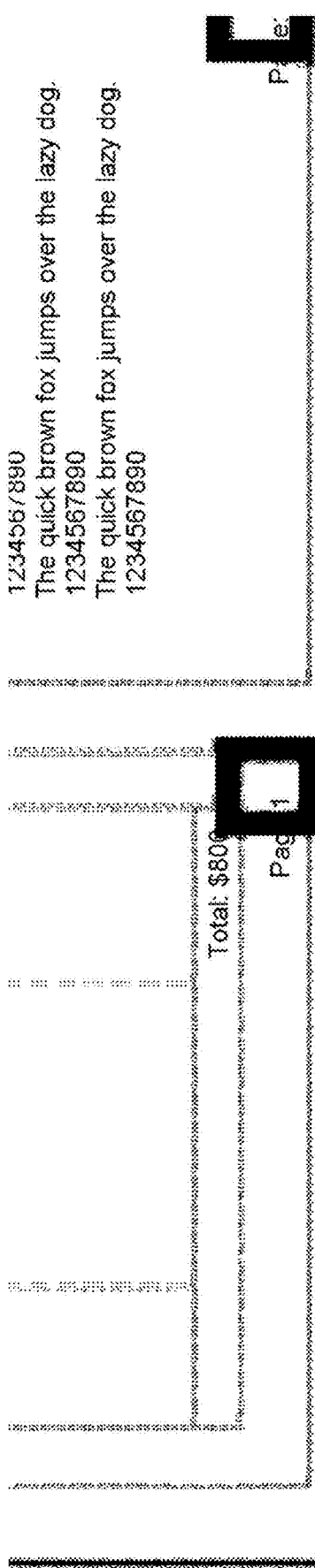

FIG. 8 shows a screen example 501 of the rule setting screen. In this example, the image of the page is displayed for each page of the document unit of the rule data 220, and the page number area can be set. In screen example 501, the page number area is indicated by a thick rectangle in the image of each page. Further, the coordinates of the rectangle in the page number area and the page number ("Page #:") are displayed in a configurable manner below the image of the page. In addition, in this screen example 501, on a page where the page number area does not exist, the thick rectangle is not displayed in the image of the page, the coordinates become "(0, 0, 0, 0)", and the page number is manually input by the user.

FIG. 9 shows a screen example 502 of the user rule setting screen. Here, it is possible to specify an area of layout data for the image of each page and set a user rule regarding the character string in this area. This user rule can be set to be applied, for example, before or after the rule-based classification or the page number extraction. In the screen example 502, an example of setting {when "123456789" is detected in the coordinates (200, 800, 220, 820), the classification is changed to "invoice_Kyocera (2)"} in natural language or macro language as a user rule is shown.

Figure 10A:
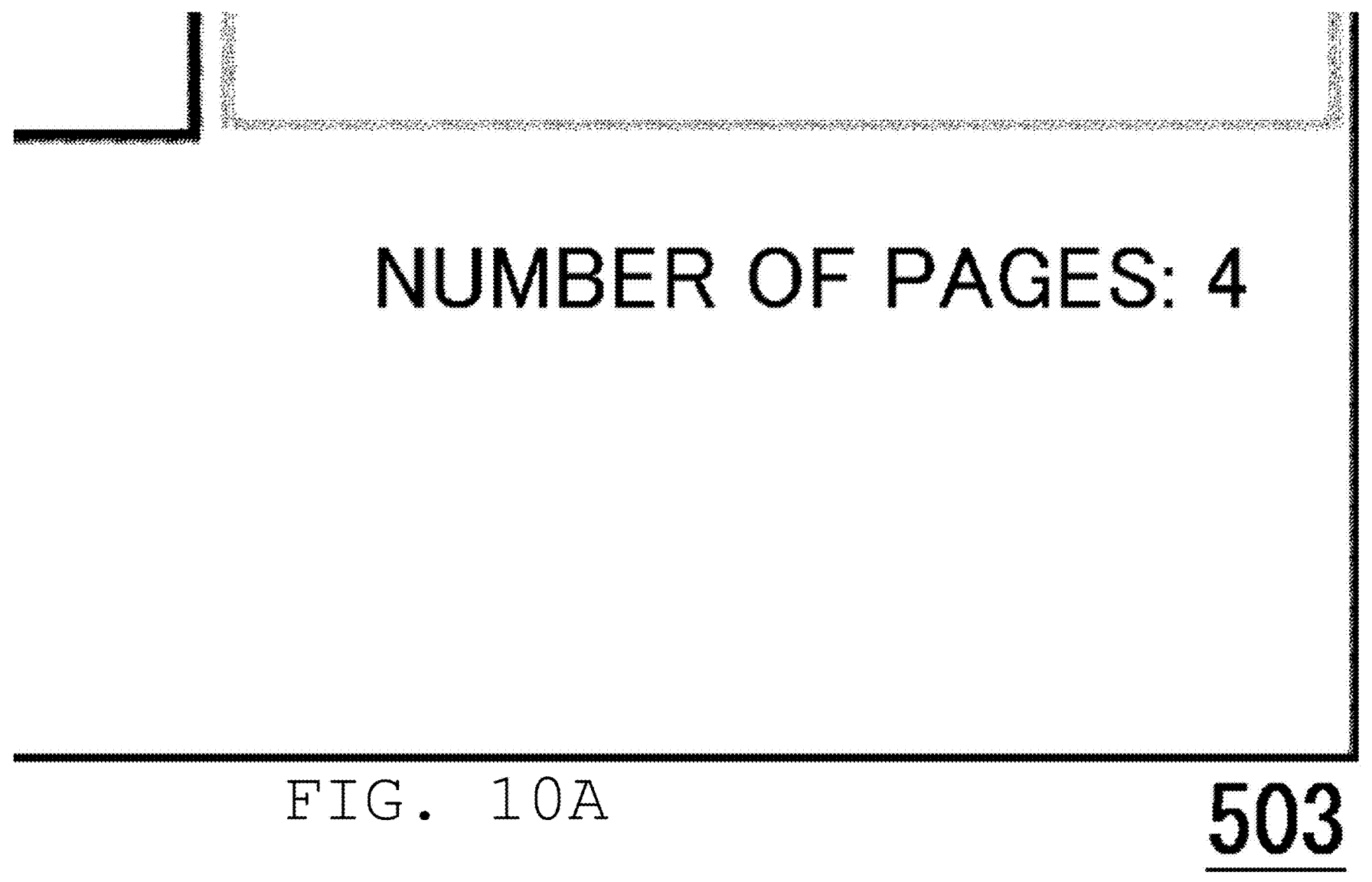
Figure 10B:
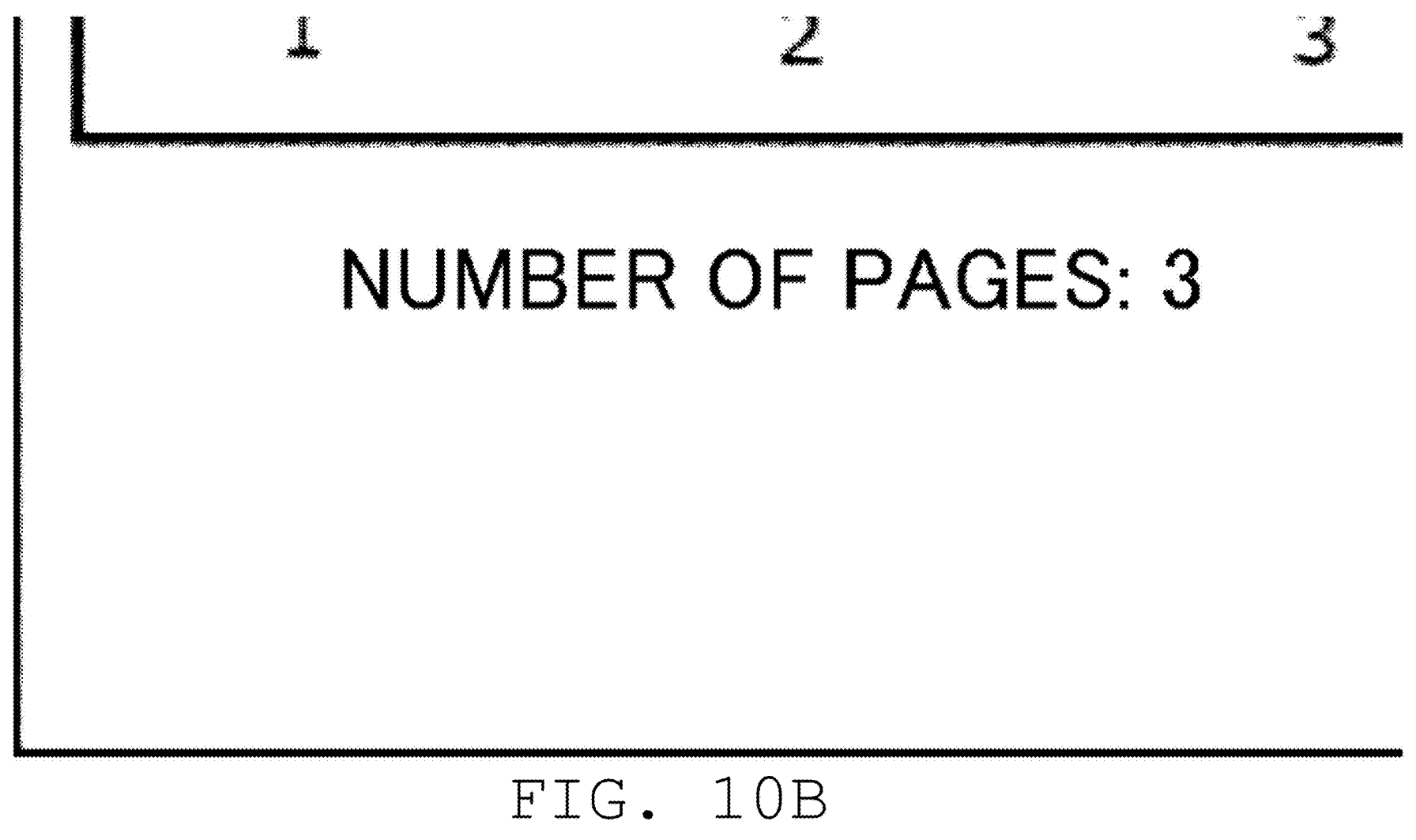
Figure 10C:
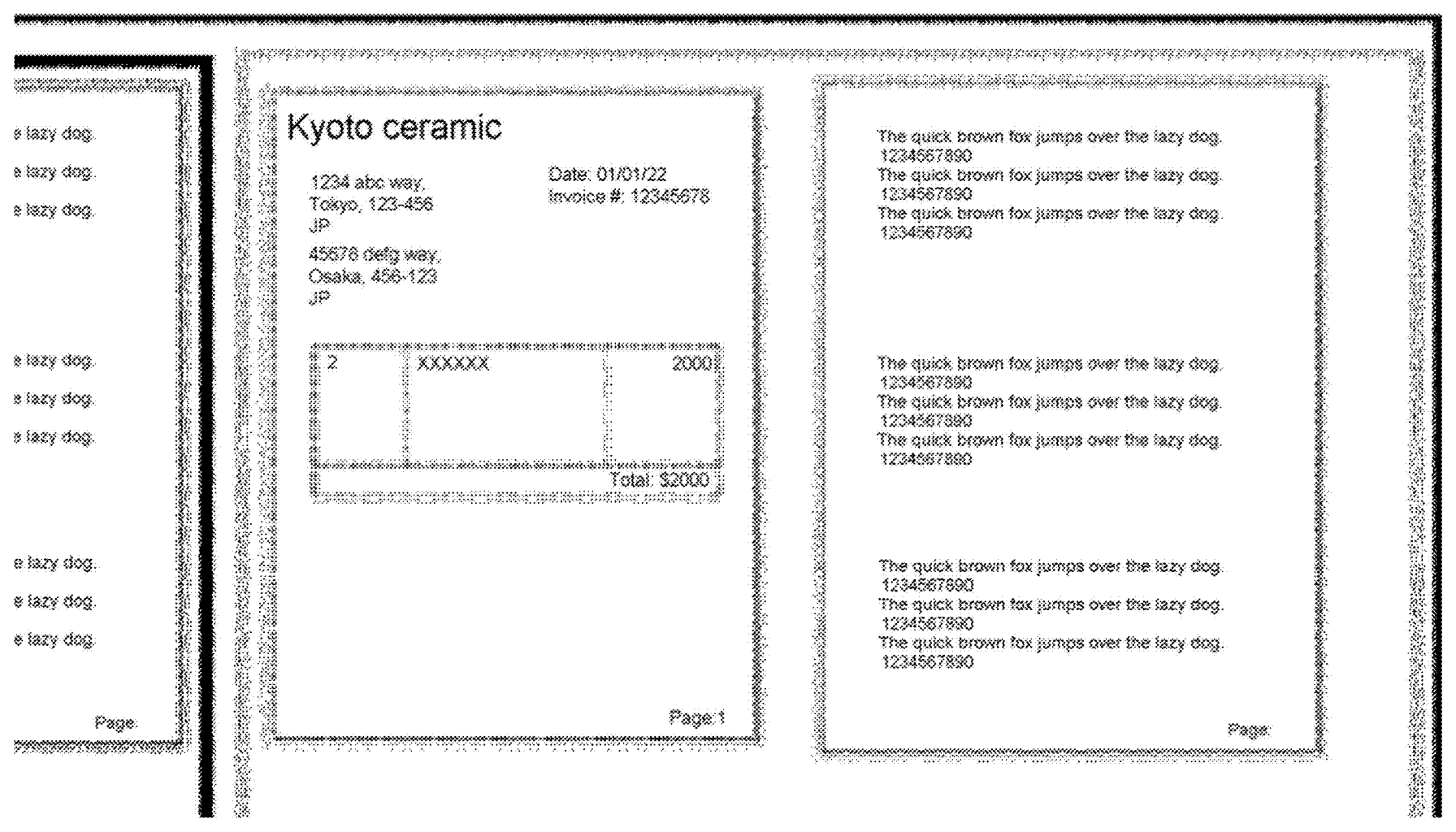
Figure 10D:
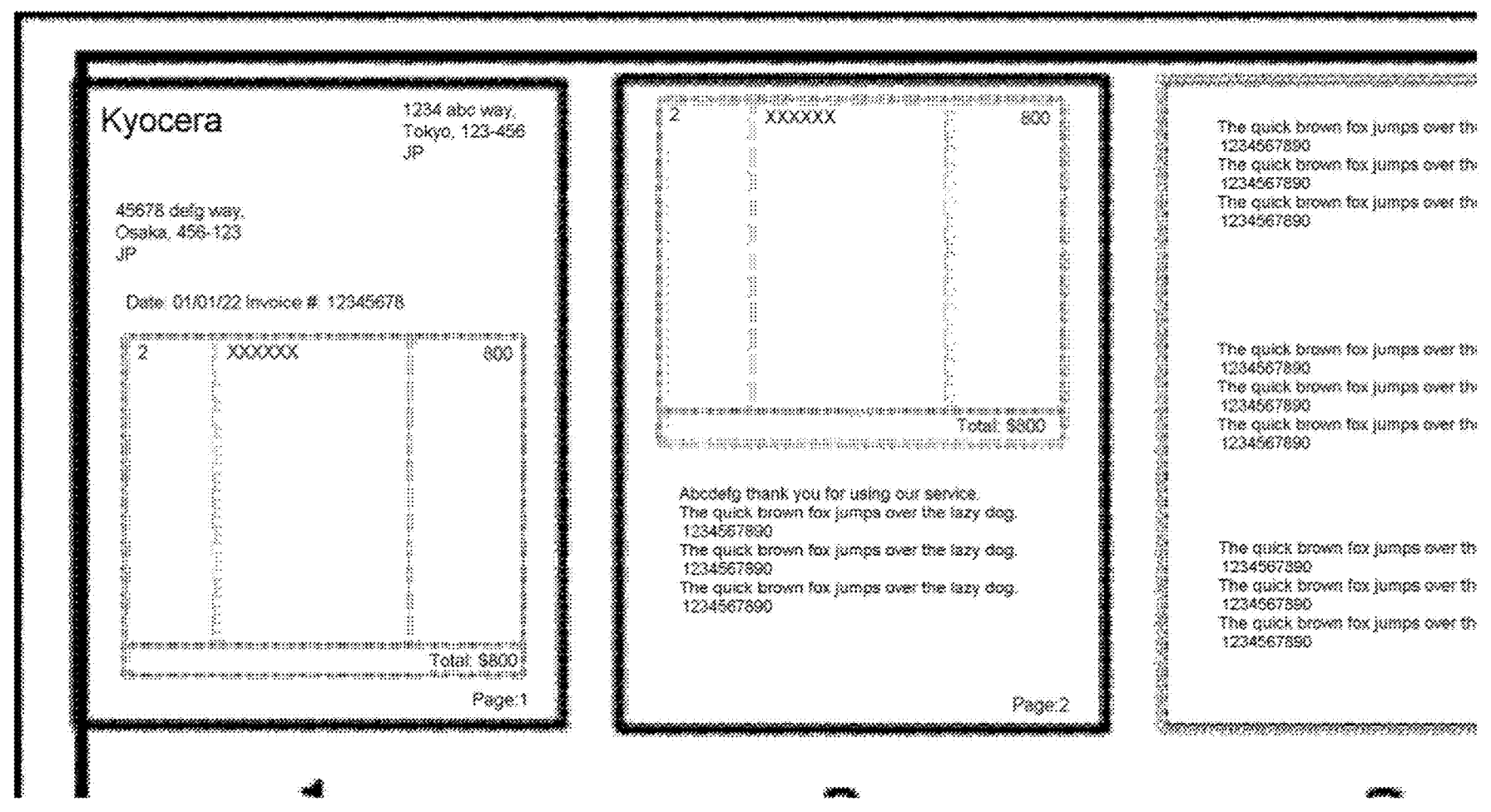

FIG. 10 shows a screen example 503 for confirming ordering and division. Here, an example in which each page of each division data 230 is displayed and ordered is shown. Each page in each division data 230 is ordered in the order of the extracted page numbers in the page data 200. On this basis, for each page, the certainty of the page number after ordering is shown in the thick frame, and the page number is shown below the thick frame. Further, the certainty of the division data 230 is shown by the darkness of the thick frame in units of the division data 230. In this example, the darker the color of each thick frame, the higher the certainty, and the lighter the color, the lower the certainty. On this screen, the ordering result can be modified by dragging and dropping, or it can move to the rule setting screen by pressing each page.

In addition, the rule setting unit 110 can change the display so as to display the division certainty of the division data 230 and the certainty of the entire division. Further, the rule setting unit 110 can display the entire certainty of the page data 200.

(Step S120)

Next, the rule setting unit 110 determines whether or not there has been a correction. The rule setting unit 110 determines Yes if the user gives an instruction to modify the rule in the GUI. In other cases, the rule setting unit 110 determines No.

In the case of Yes, the rule setting unit 110 advances the process to step S121.

In the case of No, the rule setting unit 110 advances the process to step S122.

(Step S121)

If there is the correction, the rule setting unit 110 performs the correction rule ML reflection process.

The rule setting unit 110 reflects the rule data 220 modified by the user in the machine learning model. On this basis, the rule setting unit 110 causes each unit to execute the ordering and division of the page data 200. As a result, the rule setting unit 110 can recalculate the certainty based on the rule setting set by the user and present it in the above-mentioned GUI.

(Step S122)

Here, the division history unit 150 performs the history storage process.

The division history unit 150 stores the history of the page number extraction and division for the plurality of page data 200 based on the classification of the characters and the layout performed OCR by the OCR unit 100 as the history data 250. The history data 250 is used by the rule order unit 120, and the like, as described above. Further, the division history unit 150 may store each data of the division data 230 and the corresponding rule data 220 in the history data 250. In this case, the division history unit 150 may use the data corrected by the user as the history data 250.

As described above, the automatic ordering, dividing, and setting process according to the embodiment of the present disclosure is completed.

As configured in this way, the following effects can be obtained.

In recent years, the development of scanning technology has greatly affected business. Specifically, there is an increasing demand for technology for digitizing a large number of paper documents such as hospital charts, invoices, or the like, by scanning and inputting them into business systems. However, in order to scan a large number of paper documents, there was actually a process of manually correcting the page order.

This is because the number of pages differs for each paper document, the page description position may change even for the same type of the paper document, the page number is not described, or there is a unique rule where a classification cannot be determined only by the layout.

Due to the process of reordering the pages, it was necessary to transport the paper document to a manual scanning center, which was costly.

For this reason, although it is conceivable to unify the format of paper documents to a certain level, it is necessary for users to comply with strict restrictions, and as a result, there have been cases where business efficiency has not been improved.

On the other hand, in a typical technique, it was possible to add a barcode or the like to a paper document to correct the page order. However, it was not accepted by users because it could not change the format of existing paper documents.

On the other hand, another typical technique required the definition of an area that identifies the form in order to read information from the scanned voucher.

For this reason, the process failed when the area did not exist and it was similar to other forms.

On the other hand, the image forming apparatus 1 according to the embodiment of the present disclosure is an information processing apparatus for ordering a plurality of scanned page data 200 including: an OCR unit 100 that performs optical character recognition for character and layout in a page for each of the plurality of page data 200; a rule order unit 120 that classifies each of the plurality of page data 200 based on a page ordering rule according to the characters and the layout that are performed optical character recognition by the OCR unit 100, extracts a page number, and calculates certainty of the page number; and an ML order unit 130 that classifies page data 200 of a page with low certainty calculated by the rule order unit 120 by machine learning and infer the page number.

With this configuration, rules and machine learning can be used together, and if the certainty is low, the page number can be inferred by machine learning. Therefore, even if there is no area to specify the form or the document is similar to other forms, the pages can be ordered with high accuracy by using machine learning. In addition, the certainty of the rule can be used to reduce the processing load by reducing the inference of the page number by machine learning, and the time to complete the processing by machine learning can be shortened.

The image forming apparatus 1 according to the embodiment of the present disclosure further including: a rule setting unit 110 that classifies each page of the page data 200 including a plurality of pages by using the layout and the font in the page and sets the rule by extracting a page number based on classified coordinates and character string in the page.

With this configuration, it is possible to automatically set a page ordering rule from the page data 200. Therefore, it is not necessary for the user to set the area one by one, and the time and effort can be reduced.

In the image forming apparatus 1 according to the embodiment of the present disclosure, the rule order unit 120 calculates the certainty by similarity of the layout, the similarity of font, and the similarity of extraction results of the page numbers.

With this configuration, the accuracy of page number extraction by the rule can be improved. As a result, even similar page data 200 can be ordered with high accuracy. As a result, the user's effort can be reduced.

In the image forming apparatus 1 according to the embodiment of the present disclosure, the ML order unit 130 performs classification by any one or any combination of a model by using the layout and image data of the page, a model by using the layout and characters, and a model for detecting abnormal value and the certainty of classification result by the rule order unit 120, and it infers the page number based on a model by using based on the layout and characters.

With this configuration, by using the model by using various optimum algorithms, it is possible to estimate the page number even more reliably for pages that cannot to be ordered by the rules. This can reduce the user's burden.

The image forming apparatus 1 according to the embodiment of the present disclosure further includes an entire certainty calculation unit 140 that calculates entire certainty from the certainty calculated by the rule order unit 120 and the inference certainty of the page number extracted by the ML order unit 130.

With this configuration, it is possible to calculate the certainty of the entire page data 200, and it is possible to present a clue to let the user judge whether or not the extraction result of the page number is correct. Therefore, it becomes user-friendly.

On the other hand, in yet another typical technology, as a method of dividing a scanned document, a method of dividing by a fixed number of pages, a partition page, and a cover page division is provided.

However, this technology required the manual insertion of partition pages by the user. Furthermore, the fixed number of pages and the cover division have the problem that they are completely useless if the pages are not ordered correctly. Furthermore, even in the same form, the actual document may have different numbers of pages, so it could not be applied in that case either.

On the other hand, the image forming apparatus 1 according to the embodiment of the present disclosure is an information processing apparatus that divides page data 200 having a plurality of pages that is scanned, including: an OCR unit 100 that performs OCR for character and layout in a page for each of the plurality of pages in the page data 200; and a rule order unit 120 that classifies each of the plurality of pages in the page data 200 based on a page ordering rule according to the character and the layout that are performed optical character recognition by the OCR unit 100 and divide the plurality of pages in the page data 200 into page units.

With this configuration, it is possible to automatically divide pages with high accuracy by using rules and machine learning together. This saves the user the hassle of having to insert a divider page. In addition, when the certainty is low, it is possible to infer the division position by machine learning. Therefore, even if the pages of the document are not ordered correctly, it is possible to divide the document with high accuracy by using machine learning. Furthermore, since the division by the rule and the division by the machine learning are determined by the certainty, the page division can be performed more flexibly. In addition, the certainty of the rule can be used to reduce the processing load by reducing the estimation of division by machine learning, and the time to complete the processing by machine learning can be shortened.

In the image forming apparatus 1 according to the embodiment of the present disclosure, the rule order unit 120 calculates the division certainty from the similarity of layout, the similarity of fonts, and the similarity of the extraction result of page numbers.

With such a configuration, the accuracy of division according to the rule can be improved, and even similar page data 200 can be divided with high accuracy.

The image forming apparatus 1 according to the embodiment of the present disclosure further including: an ML order unit 130 that classifies the pages of the page data 200 with low division certainty calculated by the rule order unit 120 by machine learning and perform division; and wherein the ML order unit 130 performs classification by any one or any combination of a model by using the layout and image data of the page, a model by using the layout and characters, and a model for detecting abnormal value and the certainty of classification result by the rule order unit 120, and it infers the division position based on a model by using the layout and characters.

With this configuration, with the models by using various optimal algorithms, even if it cannot be divided by the rule, the division is surely performed by machine learning, and thus user's labor can be reduced.

The image forming apparatus 1 according to the embodiment of the present disclosure further including an entire certainty calculation unit 140 that calculates entire division certainty from the division certainty calculated by the rule order unit 120 and inference certainty of the division position extracted by the ML order unit 130.

With this configuration, the division certainty of the entire page data 200 can be calculated, and the user can judge whether the division result is correct, which becomes user-friendly.

The image forming apparatus 1 according to the embodiment of the present disclosure is an information processing apparatus that divides the page data 200 having a plurality of pages that is scanned, including: an OCR unit 100 that performs OCR for character and layout in a page for each of the plurality of pages of the page data 200; a division history unit 150 that stores division history of the plurality of page of the page data 200 in page units based on classification of the character and the layout that are performed optical character recognition by the OCR unit 100 in the history data 250; and a rule order unit 120 that classifies and divides each of a plurality of newly scanned pages of the page data 200 into page units by referring to the division history of history data 250 stored by the division history unit 150.

With this configuration, the appropriate number of pages can be determined from the number of pages of the past document, and the like. Therefore, division with higher accuracy can be achieved.

In the image forming apparatus 1 according to the embodiment of the present disclosure, the rule order unit 120 calculates the division certainty based on the standard deviation and/or the normal distribution of the past divisions in the division history of the history data 250.

With such a configuration, more reliable division becomes possible. Therefore, the time and effort of the user can be reduced.

The image forming apparatus 1 according to the embodiment of the present disclosure further includes an ML order unit 130 that classifies the pages of page data 200 with low certainty calculated by the rule order unit 120 by machine learning and performs division; and wherein the ML order unit 130 performs division based on inference certainty by the machine learning.

With such a configuration, when the certainty is low, the division can be performed with high accuracy by machine learning, and the page division can be performed more flexibly. In addition, the processing load can be reduced and the time until the processing is completed can be shortened.

The image forming apparatus 1 according to the embodiment of the present disclosure is an information processing apparatus that sets a rule for ordering pages in the page data 200 having a plurality of scanned pages, including: an OCR unit 100 that performs OCR for characters and layout for each of the plurality of page in the page data 200; a rule order unit 120 that classifies each of the plurality of page data based on the page ordering rule according to the characters and the layout that are performed optical character recognition by the OCR unit 100, extract a page number, and calculate certainty of the page number; and a rule setting unit 110 that presents the user with the certainty calculated by the rule order unit 120 and causes the user to set the rule.

With this configuration, it is possible to easily set the ordering rule. That is, after automatically classifying the pages, the page numbers can be extracted and set by the user, which saves the user's burden. Therefore, the trouble of manually inputting the correct page order one by one can be reduced.

Further, in the present embodiment, it is possible to easily add a user-specific user rule by using the GUI.

The image forming apparatus 1 according to the embodiment of the present disclosure further includes an ML order unit 130 that classifies pages of page data 200 with low certainty calculated by the rule order unit 120 by machine learning and infers page numbers; and wherein the rule setting unit 110 also presents the inference certainty calculated by the ML order unit 130 to the user.

With this configuration, the certainty calculated by machine learning can be presented to the user and make a judgment.

Further, in the present embodiment, the presence or absence of machine learning can also be presented and set to the user by a GUI, or the like.

The image forming apparatus 1 according to the embodiment of the present disclosure further including: an entire certainty calculation unit 140 that calculates entire certainty from the certainty calculated by the rule order unit 120 and the inference certainty of the page number extracted by the ML order unit 130; and wherein the rule setting unit 110 also presents the entire certainty calculated by the entire certainty calculation unit 140 to the user.

With this configuration, a clue to let the user judge whether or not the entire division result is correct from the certainty of the entire page data 200 can be presented.

In the image forming apparatus 1 according to the embodiment of the present disclosure, a rule order unit 120 divides the plurality of pages in the page data 200 into page units and generates division data 230; and an ML order unit 130 further classifies the page in the page data 200 with the low division certainty by the rule order unit 120 by machine learning and divides the page data 200 to generate the division data 230; and the entire certainty calculation unit 140 further calculates the division certainty in a unit of the division data 230 divided by the rule order unit 120 and/or an ML order unit 130.

With this configuration, the certainty of each division data 230 can be presented to the user, which becomes user-friendly.

In the image forming apparatus 1 according to the embodiment of the present disclosure, the rule setting unit 110 recalculates and presents the certainty based on the rule setting set by the user.

By configuring in this way, it is possible to confirm that the division is correctly performed by the user setting the rule. Therefore, the user's trouble can be saved.

Other Embodiments

In addition, in the above-described embodiment, each process executed by the image forming apparatus is described. However, the present disclosure can be applied to information processing apparatuses other than image forming apparatuses. For example, a network scanner, a server for acquiring scan data, or the like, may be used.

By configuring in this way, a flexible configuration can be supported.

Further, in the above-described embodiment, the control unit 10 and the image processing unit 11 are used at the same time to perform each process is described.

However, the ordering and division by rules and the ordering and division by machine learning may be executed in separate processing units. Further, the data may be transmitted to a server, or the like, dedicated to machine learning and executed by a plurality of information processing apparatuses.

With this configuration, flexible processing can be executed according to the quantity and quality of data.

Further, in the above-described embodiment, the division data 230 after generation is described so as to be stored in the image forming apparatus 1.

However, the division data 230 may be transferred to an information processing apparatus such as another business server by e-mail, FTP (File Transfer Protocol), or the like, and may be input as business data by these.

By configuring in this way, data can be input to the business system as it is, and the user's burden can be reduced.

Further, in the above-described embodiment, although an example of the machine learning algorithm used by the ML order unit is described, other algorithms, statistical models, and the like, can also be used.

Further, it is needless to say that the configuration and operation of the above-described embodiment are examples and can be appropriately modified and executed without departing from the aim of the present disclosure.

What is claimed is:

1. An information processing apparatus for setting a rule for ordering a plurality of page data that is scanned ('page ordering rule'), comprising:
   an OCR unit that performs optical character recognition for character and layout in a page for each of the plurality of page data;
   a rule order unit configured to classify each of the plurality of page data based on the page ordering rule according to the characters and the layout that are recognized by the performance of optical character recognition by the OCR unit, extract a page number, and calculate certainty of the page number;
   a rule setting unit configured to
   present a user with the certainty of the page number calculated by the rule order unit and cause the user to set the page ordering rule;
   extract a character string indicating a page number from a corresponding page of the plurality of page data according to the layout in a classified character layout data;
   when the character string indicating the page number is extracted, acquire coordinates and font of a page number area, which is the area where the character string indicating the page number is located; and
   set a rule for extracting a page number based on the coordinates and font of the page number area in association with the classified layout data; and
   an ML order unit configured to classify page data of a page with low certainty of the page number calculated by the rule order unit by machine learning and infer the page number;
   wherein
   the rule setting unit is configured to also present inference certainty calculated by the ML order unit to the user;
   the information processing apparatus further comprises an entire certainty calculation unit configured to calculate entire certainty from the certainty calculated by the rule order unit and the inference certainty of the page number extracted by the ML order unit;
   the rule setting unit is configured to also present the entire certainty calculated by the entire certainty calculation unit to the user;
   the rule order unit is configured to divide the plurality of page data into page units and generate division data;
   the ML order unit is configured to further classify a page data of a page with low division certainty by the rule order unit by machine learning and divides the page data to generate the division data;
   the entire certainty calculation unit is configured to calculate division certainty in a unit of the division data divided by the rule order unit and/or the ML order unit;
   the rule setting unit is configured to, when presenting to the user, arrange the pages in order of the extracted page numbers to confirm ordering and division, indicate the certainty of the page number after ordering with a frame on each page, indicate the certainty of the division with darkness of a frame that is thicker than another frame, allow the user to correct an alignment result by drag and drop, and transition to a rule setting screen by pressing each page.

2. The information processing apparatus according to claim 1, wherein
   the rule setting unit is configured to recalculate and present the certainty based on the rule set by the user.

3. An image forming apparatus for setting a rule for ordering a plurality of page data that is scanned ('page ordering rule'), comprising:
- an OCR unit that performs optical character recognition for character and layout in a page for each of the plurality of page data;
- a rule order unit configured to classify each of the plurality of page data based on the page ordering rule according to the characters and the layout that are recognized by the performance of optical character recognition by the OCR unit, extract a page number, and calculate certainty of the page number;
- an image forming unit that forms an image of the scanned page data on a recording paper;
- a rule setting unit configured to
- present a user with the certainty calculated by the rule order unit and cause the user to set the page ordering rule;
- extract a character string indicating a page number from a corresponding page of the plurality of page data according to the layout in a classified character layout data;
- when the character string indicating the page number is extracted, acquire coordinates and font of a page number area, which is the area where the character string indicating the page number is located; and
- set a rule for extracting a page number based on the coordinates and font of the page number area in association with the classified layout data;
- an ML order unit configured to classify page data of a page with low certainty of the page number calculated by the rule order unit by machine learning and infer the page number;
- wherein
- the rule setting unit is configured to also present inference certainty calculated by the ML order unit to the user;
- the image forming apparatus further comprises an entire certainty calculation unit configured to calculate entire certainty from the certainty calculated by the rule order unit and the inference certainty of the page number extracted by the ML order unit;
- the rule setting unit is configured to also present the entire certainty calculated by the entire certainty calculation unit to the user;
- the rule order unit is configured to divide the plurality of page data into page units and generates division data;
- the ML order unit is configured to further classify a page data of a page with low division certainty by the rule order unit by machine learning and divides the page data to generate the division data; and
- the entire certainty calculation unit is configured to calculate division certainty in a unit of the division data divided by the rule order unit and/or the ML order unit;
- the rule setting unit is configured to, when presenting to the user, arrange the pages in order of the extracted page numbers to confirm ordering and division, indicate the certainty of the page number after ordering with a frame on each page, indicate the certainty of the division with darkness of a frame that is thicker than another frame, allow the user to correct an alignment result by drag and drop, and transition to a rule setting screen by pressing each page.

4. The image forming apparatus according to claim 3, wherein
- the rule setting unit is configured to recalculate and presents the certainty based on the rule set by the user.

5. An information processing method executed by an information processing apparatus for setting a rule for ordering a plurality of page data that is scanned ('page ordering rule'), comprising the steps of:
- performing optical character recognition for character and layout in a page for each of the plurality of page data;
- classifying each of the plurality of page data based on the page ordering rule according to the characters and the layout that are recognized by the performance of optical character recognition and extracting a page number;
- calculating certainty of the page number;
- presenting a user with the certainty that is calculated;
- causing the user to set the page ordering rule;
- extracting a character string indicating a page number from a corresponding page of the plurality of page data according to the layout in a classified character layout data;
- when the character string indicating the page number is extracted, acquiring coordinates and font of a page number area, which is the area where the character string indicating the page number is located; and
- setting a rule for extracting a page number based on the coordinates and font of the page number area in association with the classified layout data;
- classifying page data of a page with low certainty of the calculated page number by machine learning and inferring the page number;
- presenting calculated inference certainty to the user;
- calculating entire certainty from the certainty calculated by the rule and the inference certainty of extracted page number; and
- presenting calculated entire certainty to the user;
- dividing the plurality of page data into page units and generates division data;
- further classifying a page data of a page with low division certainty by the rule by machine learning and dividing the page data to generate the division data;
- calculating division certainty in a unit of divided division data;
- when presenting to the user, arrange the pages in order of the extracted page numbers to confirm ordering and division, indicate the certainty of the page number after ordering with a frame on each page, indicate the certainty of the division with darkness of a frame that is thicker than another frame, allow the user to correct an alignment result by drag and drop, and transition to a rule setting screen by pressing each page.

6. The information processing method according to claim 5, further comprising
- recalculating and presenting the certainty based on the rule set by the user.

7. The information processing apparatus according to claim 1, wherein
- the rule setting unit is configured to display the coordinates of a rectangle of the page number area and the page number under an image of the page in a configurable manner.

8. The information processing apparatus according to claim 1, wherein
- the rule order unit is configured to search for an approximate layout that is closest to an order layout corresponding to the order page of the plurality of page data as a classification, and extract a page number from recognition result of the character string in the page number area of the order page for the searched approximate layout based on the rule.

* * * * *